(12) United States Patent
Pietsch et al.

(10) Patent No.: US 11,729,470 B2
(45) Date of Patent: Aug. 15, 2023

(54) PREDICTIVE MEDIA ROUTING BASED ON INTERRUPT CRITERIA

(71) Applicant: Apple Inc., Cupertino, CA (US)

(72) Inventors: Brian D. Pietsch, Foster City, CA (US); Craig M. Federighi, Los Altos Hills, CA (US); Adam A. Sonnanstine, San Francisco, CA (US); Taylor G. Carrigan, San Francisco, CA (US); Johannes P. Schmidt, Los Altos Hills, CA (US); Astrid Yi, Sunnyvale, CA (US); Deepak Iyer, Sunnyvale, CA (US); Thomas Alsina, Saratoga, CA (US); Jonathan A. Bennett, San Francisco, CA (US); Patrick L. Coffman, San Francisco, CA (US); Cesar de Camargo Barscevicius, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/547,887

(22) Filed: Dec. 10, 2021

(65) Prior Publication Data
US 2022/0103903 A1    Mar. 31, 2022

Related U.S. Application Data

(63) Continuation of application No. 16/720,783, filed on Dec. 19, 2019, now Pat. No. 11,234,051.
(Continued)

(51) Int. Cl.
*H04N 21/466* (2011.01)
*H04N 21/442* (2011.01)
*H04N 21/436* (2011.01)

(52) U.S. Cl.
CPC ... *H04N 21/4667* (2013.01); *H04N 21/43615* (2013.01); *H04N 21/44227* (2013.01); *H04N 21/4661* (2013.01)

(58) Field of Classification Search
CPC .......... H04N 21/25891; H04N 21/482; H04N 21/4532; H04N 21/4122; H04N 21/6125;
(Continued)

(56) References Cited

U.S. PATENT DOCUMENTS

| 5,796,423 A | * | 8/1998 | Robbins | ................. H04N 5/602 |
| | | | | 348/E7.063 |
| 8,350,694 B1 | * | 1/2013 | Trundle | ........... G08B 13/19656 |
| | | | | 340/539.11 |

(Continued)

FOREIGN PATENT DOCUMENTS

| CN | 102123298 A | 7/2011 |
| CN | 106416263 A | 2/2017 |

(Continued)

OTHER PUBLICATIONS

B. Ospan, N. Khan, J. Augusto, M. Quinde and K. Nurgaliyev, "Context Aware Virtual Assistant with Case-Based Conflict Resolution in Multi-User Smart Home Environment," 2018 International Conference on Computing and Network Communications (CoCoNet), 2018, pp. 36-44, doi: 10.1109/CoCoNet.2018.8476898. (Year: 2018).*

*Primary Examiner* — Cynthia M Fogg
(74) *Attorney, Agent, or Firm* — Invoke

(57) ABSTRACT

In some implementations, a user device can predictively route media content to a remote playback device based on playback context information obtained by the user device. The playback context can include local playback context information related to the state and/or context of the user device. The playback context can include remote playback context information related to the state and/or context of available remote playback devices. Based on the playback
(Continued)

context information obtained by the user device, the user device can generate a predictive score for each available playback device that indicates or predicts the likelihood that the user will want to send media content to the corresponding playback device. The user device can generate and present a graphical user interface that can identify the playback devices having predictive scores over a threshold score. In some instances, the user device can automatically route selected media content to a predicted playback device.

20 Claims, 11 Drawing Sheets

Related U.S. Application Data

(60) Provisional application No. 62/796,468, filed on Jan. 24, 2019, provisional application No. 62/788,625, filed on Jan. 4, 2019.

(58) Field of Classification Search
CPC ......... H04N 21/6582; H04N 21/43622; H04N 21/44227; H04N 21/4667; H04N 21/4661; H04N 21/43615; H04N 21/431; H04N 21/4126; H04N 21/44231; H04N 21/4325; H04N 21/42204; H04N 21/43637; H04N 21/41407; H04N 21/4104
USPC .......................................................... 725/14
See application file for complete search history.

(56) References Cited

U.S. PATENT DOCUMENTS

| | | |
|---|---|---|
| 8,412,798 B1 | 4/2013 | Wang |
| 9,084,003 B1 | 7/2015 | Sanio et al. |
| 10,028,031 B2* | 7/2018 | Tranchina ........ H04N 21/43637 |
| 10,958,974 B2 | 3/2021 | Glazier et al. |
| 11,115,695 B2 | 9/2021 | Lewis et al. |
| 2006/0253782 A1* | 11/2006 | Stark ................ H04M 1/72403 715/727 |
| 2009/0177965 A1* | 7/2009 | Peralta .................... G06F 9/451 715/716 |
| 2012/0009906 A1* | 1/2012 | Patterson ................ H04W 4/20 455/414.1 |
| 2012/0198499 A1 | 8/2012 | Louie et al. |
| 2012/0284757 A1* | 11/2012 | Rajapakse ........ H04N 21/41407 725/81 |
| 2013/0125168 A1 | 5/2013 | Agnihotri et al. |
| 2013/0174035 A1 | 7/2013 | Grab |
| 2014/0007154 A1* | 1/2014 | Seibold ................ H04N 21/454 725/25 |
| 2014/0106815 A1 | 4/2014 | Sako et al. |
| 2014/0128043 A1 | 5/2014 | Shen |
| 2014/0128046 A1 | 5/2014 | Lee et al. |
| 2014/0331135 A1* | 11/2014 | Sukoff .................. H04L 65/764 715/719 |
| 2015/0201023 A1 | 7/2015 | Kotab |
| 2017/0093356 A1* | 3/2017 | Cudak ...................... H03G 3/32 |
| 2017/0315769 A1* | 11/2017 | Penke ................... G06F 3/0412 |
| 2018/0196596 A1 | 7/2018 | Kim et al. |
| 2018/0343492 A1 | 11/2018 | Wiitala et al. |
| 2020/0057596 A1 | 2/2020 | Kim et al. |
| 2020/0145244 A1* | 5/2020 | Hollinger ............ H04L 12/2809 |
| 2020/0250412 A1 | 8/2020 | Suzuki et al. |

FOREIGN PATENT DOCUMENTS

| | | |
|---|---|---|
| CN | 108781305 A | 11/2018 |
| KR | 10-1752417 B1 | 6/2017 |
| KR | 10-1902098 B1 | 9/2018 |
| WO | 2018/151522 A1 | 8/2018 |

* cited by examiner

PREDICTIVE MEDIA ROUTING BASED ON INTERRUPT CRITERIA

INCORPORATION BY REFERENCE; DISCLAIMER

Each of the following applications are hereby incorporated by reference: application Ser. No. 16/720,783 filed on Dec. 19, 2019; application No. 62/796,468 filed on Jan. 24, 2019; application No. 62/788,625 filed on Jan. 4, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The disclosure generally relates to routing media content from a user device to playback devices.

BACKGROUND

Modern user devices (e.g., smartphones, tablet computers, laptop computers, etc.) often include functionality that allows a user to present media content selected by the user on the user device (e.g., local device) on a playback device (e.g., television, set-top-box, smart speakers, etc.). On some user devices, the user will be required to provide a sequence of user input to cause the user device to send selected media content to a playback device. For example, the user will typically open a software application, select a media content item, select a play button to begin playing the selected content item locally on the user device, select another button to indicate that the user wishes to stream or send the media content to a playback device, navigate through a list of available playback devices, and select a playback device to cause the user device to begin streaming or sending the selected content item to the selected remote playback device. This multi-input process for routing media to a playback device can be cumbersome, time consuming, and frustrating.

SUMMARY

In some implementations, a user device can predictively route media content to a remote playback device based on playback context information obtained by the user device. The playback context can include local playback context information related to the state and/or context of the user device. The playback context can include remote playback context information related to the state and/or context of available remote playback devices. Based on the playback context information obtained by the user device, the user device can generate a predictive score for each available playback device that indicates or predicts the likelihood that the user will want to send media content to the corresponding playback device. The user device can generate and present a graphical user interface that can identify the playback devices having predictive scores over a threshold score. In some instances, the user device can automatically route selected media content to a predicted playback device.

Particular implementations provide at least the following advantages. Media content can be routed to a remote playback device without requiring a user to select the remote playback device. When prompting the user to select a playback device, the process of selecting a remote playback device can be made more efficient by presenting the playback devices that the user is most likely to select in an easily accessible location. The user's privacy can be protected by collecting context information and generating prediction scores for each playback device completely on the user's device. Since the context information is not distributed outside of the user's device, the context information is not accessible by unauthorized entities (e.g., people, businesses, etc.). Because the processes related to predictive media routing (e.g., GUI creation, obtaining context information, playback device identification, playback device selection, etc.) are performed by the operating system of the user device, third party applications do not have access to information related to predictive media routing which further enhances user privacy protections provided by the disclosed system.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Example User Interfaces

Figure 1:
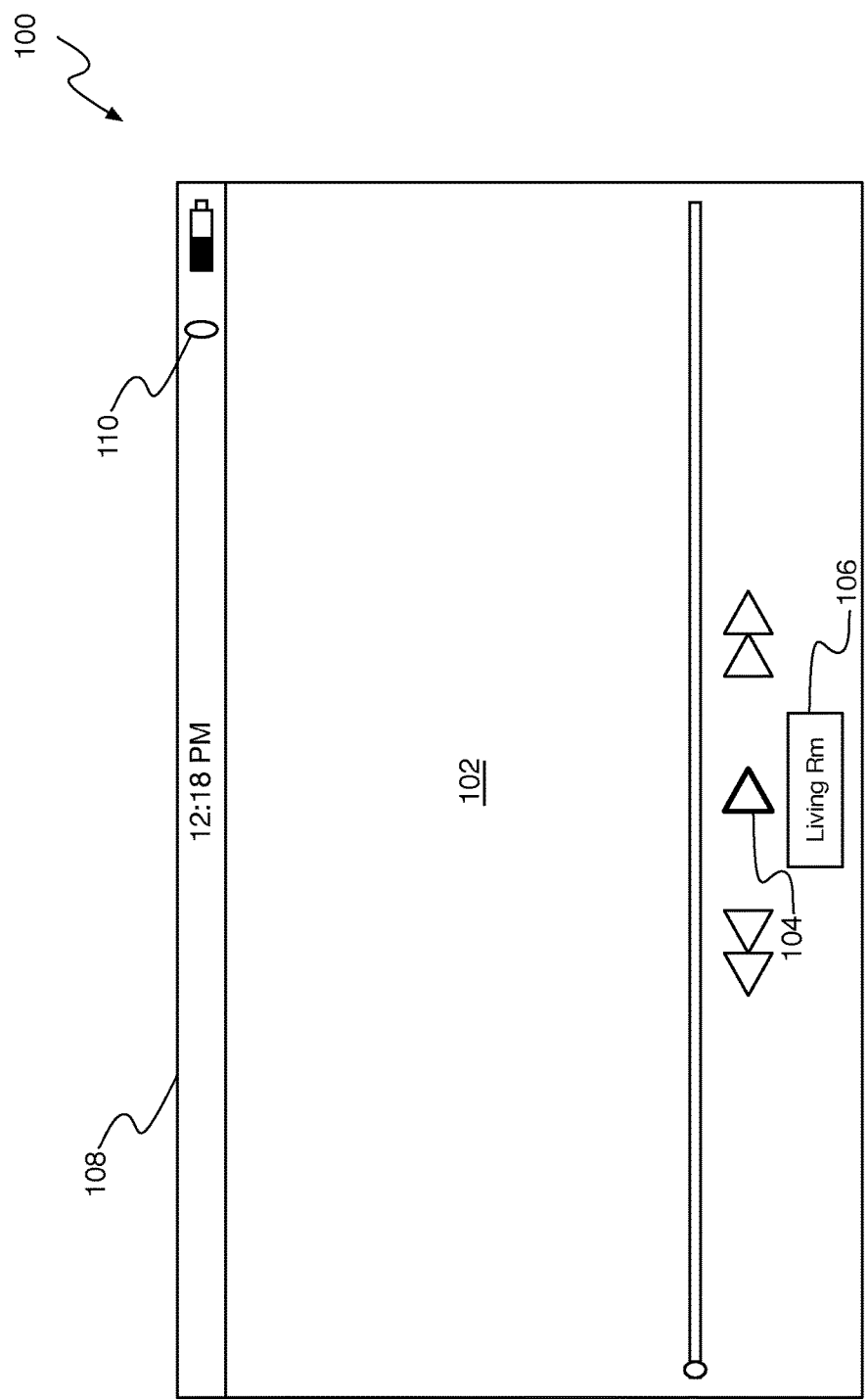
FIG. 1 is an example graphical user interface for automatically routing media content to a predicted remote playback device.

FIG. 1 is an example graphical user interface (GUI) 100 for automatically routing media content to a predicted remote playback device. For example, GUI 100 can be presented on a display of a user device (e.g., user device 302, described below).

In some implementations, GUI 100 can be generated by a software application (e.g., media application) executing on the user device. The software application can be a first party application created by the manufacturer of the user device and/or operating system of the user device. The software application can be a third-party application created by a software developer that is different than the manufacturer of the user device and/or operating system of the user device. In either case, the media routing processes and user interface elements can be implemented by the operating system of the user device to provide a consistent behavior across all applications that are executing on the user device. As an added benefit, since the media routing processes and user interface elements are provided by the operating system, the user information used for performing the media routing processes described herein is protected from exposure to third-party applications thereby enhancing user privacy protections.

In some implementations, GUI 100 can be configured to enable a user to initiate playback of media content. For example, media content can include audio content, such as music, podcasts, audio books, radio content, talk shows, and the like. Media content can include video content that may or may not include audio content. Video content can include long form video content, such as movies, television shows, commercially produced video content, or other content that exceeds a threshold period of time. Video content can include short form video content, such as amateur video content, social media video content, video content sent or received through electronic messaging systems (e.g., instant messages, SMS messages, e-mail, etc.), and the like.

In some implementations, GUI 100 can include content presentation area 102. For example, when presenting media content on GUI 100, an application (e.g., software application) can present video content in presentation area 102. If the application is presenting video content, then the video content can be presented in area 102. If the application is presenting audio only content, then the application can present a representation (e.g., artwork, album cover, picture of artist, etc.) of the content in area 102.

In some implementations, GUI 100 can include playback control graphical elements. For example, GUI 100 can include fast forward controls, rewind controls, and play control 104 (e.g., a button). In some implementations, when a user interacts with play control 104, the application will begin playback and present the user selected content using the display of the user device and/or speakers connected to the user device, depending on the type of media content.

However, in some implementations, the user device can be configured to automatically select a playback device from multiple available playback devices for presenting the selected media content. As used herein, a playback device can refer to a remote playback device, a local user device, or a grouping (e.g., two or more) of playback devices. For example, a grouping of playback devices can be considered or treated by system 300 as if it was a single playback device. A first playback device (e.g., group) is different than a second playback device (e.g. group) if the first playback device does not include exactly the same playback devices that are in the second playback device.

In some implementations, the user device can generate predictive scores for each available playback device representing a likelihood that the user will want to present the user selected media content on a corresponding playback device based on a variety of criteria (e.g., contextual attributes, machine learning model features, historical playback data, etc.), as described in detail below. The user device can then automatically select the playback device having the highest predictive score for presenting the user selected content. When the user device (e.g., operating system) automatically selects a playback device, an identifier (e.g., name) of the selected playback device can be presented on GUI element 106 (e.g., a button or other graphical object). For example, the selected playback device can be a remote playback device, such as a set-top-box, television, streaming media receiver, smart speaker, or other devices capable of receiving content from the user device. In some cases, the selected playback device can be the (e.g., local) user device.

When the playback device receives user input (e.g., touch input, cursor input, etc.) selecting play control 104 (e.g., a button) or a voice input command to initiate playback of the selected media content, the user device can automatically route the playback of the media content to the automatically selected playback device identified on graphical element 106 without requiring the user to provide any input to select a playback device. Thus, the user selected content can be presented on (e.g., streamed to, handed off to, etc.) a remote playback device that is (e.g., historically) favored by the user without requiring the user to perform multiple inputs to navigate through available remote playback devices and select a playback device for presenting the selected media content.

In some implementations, when sending media content to a remote playback device for presentation, the user device can stream the media content to the remote playback device. For example, when streaming, the user device can send incremental portions of the selected media content to the remote playback device and the remote playback device can reassemble the incremental portions of the selected media content and present the media content to the user through the display and/or speakers of the remote playback device.

In some implementations, when sending media content to the remote playback device for presentation, the user device can hand off the playback of the media content to the remote playback device by sending playback state information associated with the media content to the remote playback device. For example, the playback state information can include an identifier for the media content, an identifier for the application presenting the media content to the remote playback device, and a current playback location in the media content. When the remote playback device receives the playback state information, the remote playback device can invoke the application identified by the application identifier and provide the media content identifier and the current playback location to the application so that the application can begin presenting the identified media content at the remote playback device from the identified current location within the media content. Thus, when handing off the playback of media content to a remote playback device, the resources (e.g., battery power, processing cycles, memory resources, network resources, etc.) of the user device are not consumed with streaming media content to the remote playback device.

In some implementations, GUI 100 can include status bar 108. For example, status bar 108 can be generated and/or presented by the operating system of the user device. The operating system can present general device status information in status bar 108, such as the date, time, current battery charge level, etc.

In some implementations, status bar 108 can include graphical element 110 for indicating when a selected content item will be automatically routed to a remote playback device. For example, graphical element 110 can be highlighted (e.g., colored using a particular eye-catching color, presented in higher contrast, etc.) when a selected content item will be routed to a remote playback device. Graphical element 110 can be subdued (e.g., colored using a particular color that will blend in to GUI 100, presented in lower contrast, etc.) or hidden when the selected content item will be presented on the local user device. Generally, graphical element 110 can provide the same or similar features, interactivity, and behavior as described herein for graphical element 106. However, graphical element 110 can be presented in an area of GUI 100 that is controlled and/or generated by the operating system, while graphical element 106 can be presented in an area of GUI 100 that is controlled and/or generated by an application on the user device.

In some implementations, status bar 108 can be modified to indicate that selected content item will be automatically routed to a remote playback device. For example, user device 302 can change the color of status bar 108 (e.g., change the status bar from grey to blue) to indicate that a selected content item will be automatically routed to a remote playback device when the user subsequently provides input indicating that the user would like to play the selected content item. Alternatively, a colored banner may be displayed over status bar 108, or just below status bar 108, to indicate the selected content item will be presented on a remote playback device in response to the user providing input to play the selected content item. The status bar modification, or the banner presentation, can be presented in response to the user invoking a media application that is eligible for automatic routing of media items. The status bar modification, or banner presentation, can be presented for a period of time (e.g., 5 seconds, 30 seconds, 1 minute, etc.). For example, after the period of time has elapsed, the status bar modification, or banner presentation, can be hidden leaving graphical element 110 as an indication to the user that any media item provided by the media application will be routed to a remote playback device.

In some implementations, graphical element 106 and graphical element 110 can be mutually exclusive. For example, when graphical element 106 is presented, graphical element 110 may not be presented. When graphical element 110 is presented, graphical element 106 may not be presented. Thus, when graphical element 110 is presented, the user may be informed that the selected content item will be routed to a remote playback device in a minimally intrusive manner while still providing the automatic routing, user prompting, and user playback device selection behavior described herein above and below with respect to graphical element 106.

Figure 2:
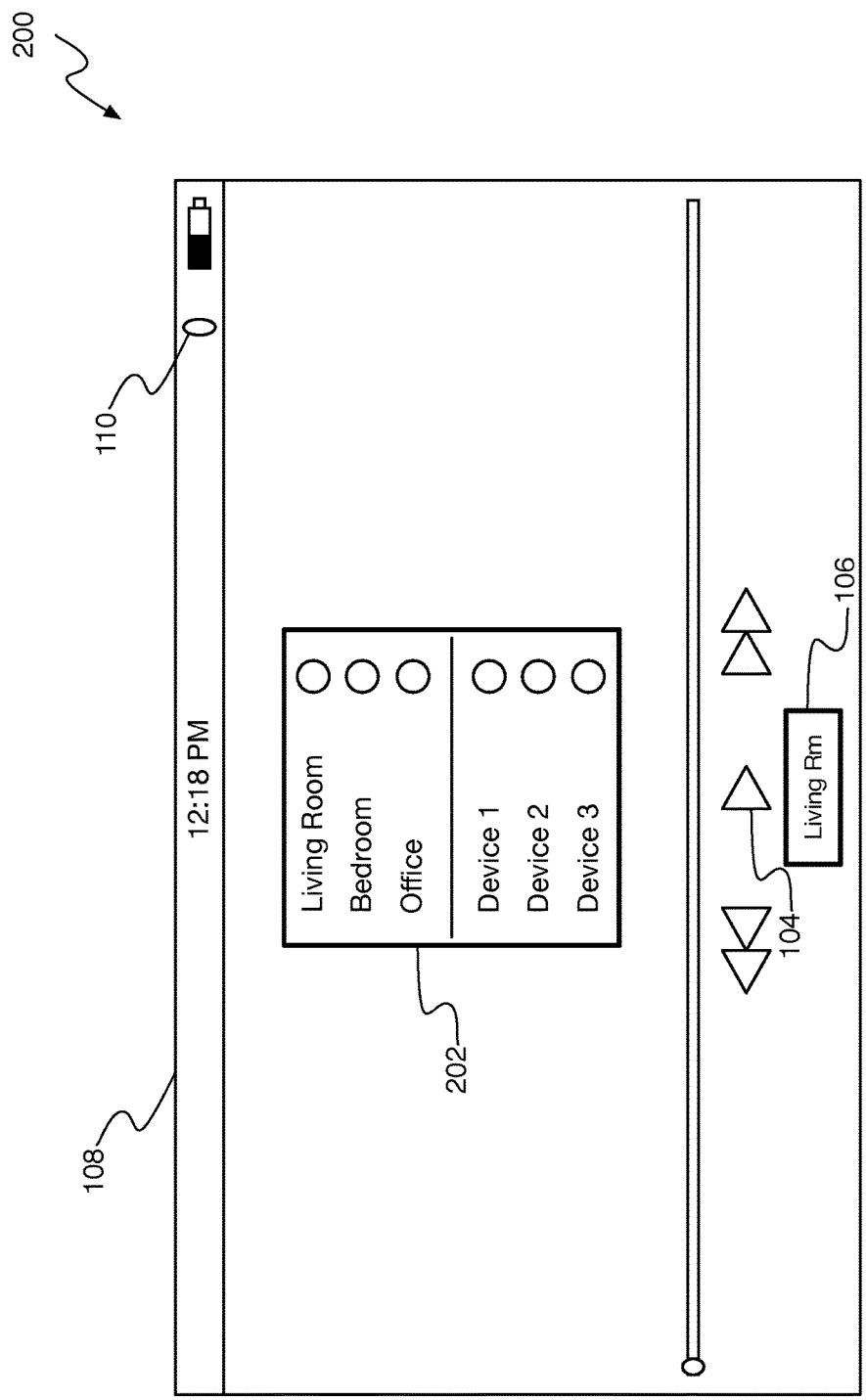
FIG. 2 is an example graphical user interface for intelligently presenting playback devices for user selection.

FIG. 2 is an example graphical user interface 200 for intelligently presenting playback devices for user selection. For example, GUI 200 can correspond to GUI 100 described above. In some cases, a user may view graphical element 106 and decide that they do not wish to present the selected media content on the playback device identified by graphical element 106. Thus, in some implementations, the user can select graphical element 106 to cause the user device to present graphical element 202. In some cases, the user device may be unable to automatically select a playback device for presenting the user selected content with a high level of confidence. Thus, in some implementations, the user device can automatically present graphical element 202 in response to receiving a user selection of playback button 104. For example, graphical element 202 can be a playback device chooser graphical user interface that presents the available playback devices detected by the user device. The user can provide input to graphical element 202 to select a desired playback device for presenting the selected media content. In response to receiving the user input, the user device can send the selected media content to the selected playback device for presentation.

In some situations, selecting a playback device can be a burdensome or cumbersome task. For example, in a large office setting or in a home having many different playback devices, the user device may detect many different available playback devices (e.g., living room device, bedroom device, office device, etc.) and present a long list of playback devices on graphical element 202. To find the desired playback device, the user may be required to look through, and possibly provide input to scroll through, a long list of playback devices.

To make the user's interaction with graphical element 202, and GUI 200, more efficient, the user device can generate predictive scores for each available playback device, as mentioned above and described in greater detail below, and sort the available playback devices presented on graphical element 202. For example, the playback devices can be sorted such that the playback devices having higher predictive scores are listed in the most accessible locations on graphical element 202. For example, the playback devices can be listed top-down, bottom-up, left to right, right to left, etc., from highest predictive score to lowest predictive score or according to some other organizational scheme that makes it easy for the user to quickly view and find the playback devices the user is most likely to select.

Automatic Selection of Playback Device

Figure 3:
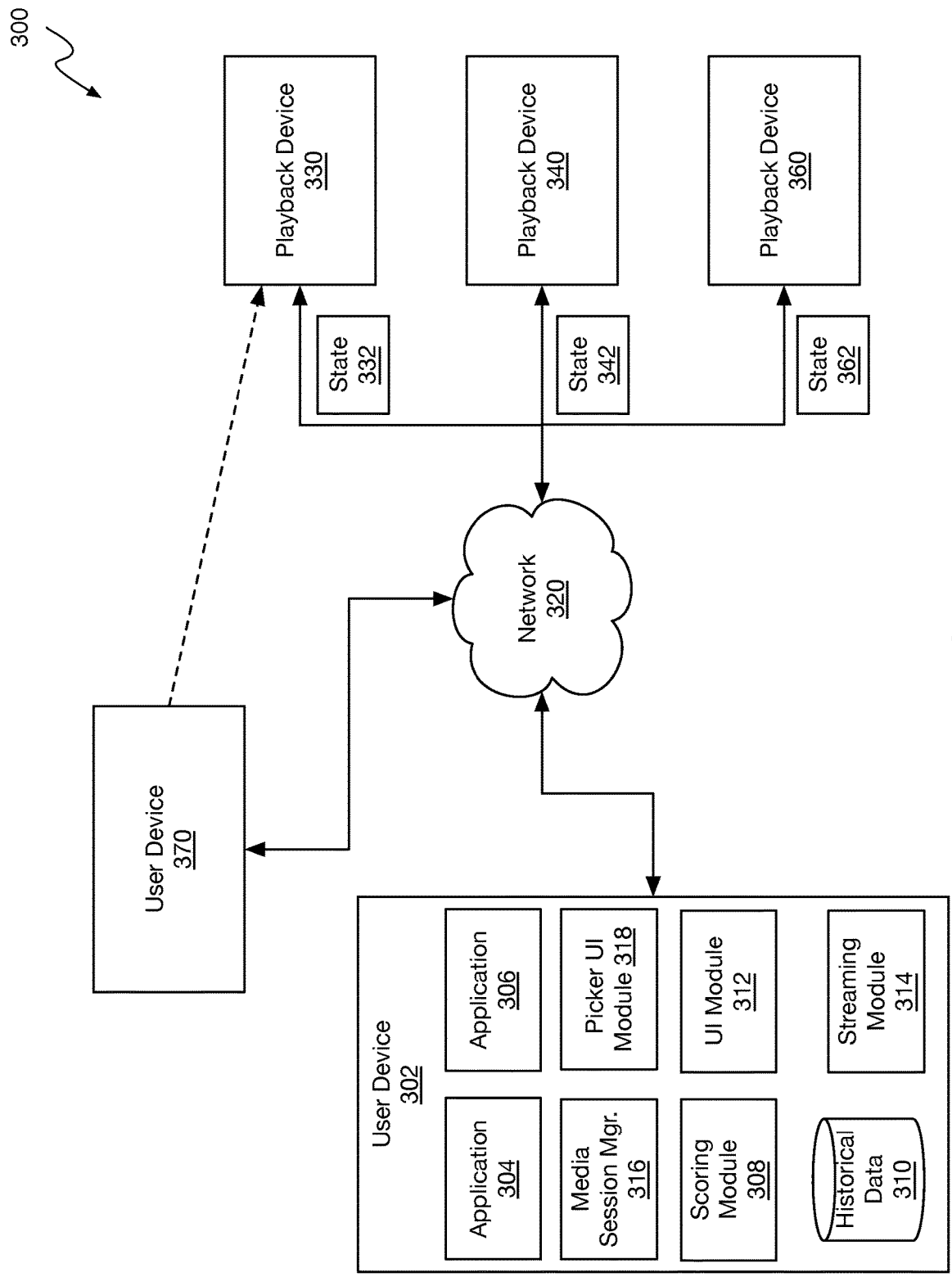
FIG. 3 is a block diagram of an example system for predictive media routing.

FIG. 3 is a block diagram of an example system 300 for predictive media routing. For example, system 300 can be configured to predictively route media to playback devices based on predictive scores generated for playback devices available to system 300. The predictive scores for each playback device can be generated based on historical user behavior (e.g., which playback device has the user selected previously), the current playback context (e.g., what type of media was selected, the location of the user device, what playback devices are available, the current state of the playback devices, etc.). The predictive scores can then be used to automatically select a playback device for presenting user selected content (as described above with reference to FIG. 1) and/or order the available playback devices according to their respective predictive scores when presenting the playback devices on a playback device selector user interface (e.g., graphical element 202 of FIG. 2).

In some implementations, system 300 can include user device 302. For example, user device 302 can be a computing device, such as a smartphone, tablet computer, laptop computer, or other computing device. User device 302 and/or the operating system of user device 302 can be configured to send (e.g., stream or hand off) media content to various playback devices (e.g., playback devices 330, 340, 360, etc.) that are accessible through network 320 (e.g., etc.) for presentation. For example, network 320 can be a local area network, Wi-Fi network, Bluetooth connection, peer-to-peer Wi-Fi, or other technology for communicating between computing devices. The playback devices 330, 340, 360 can be configured for receiving streamed and/or handed off media content from user device 302, or other similar user devices, through network 320.

In some implementations, user device 302 can include applications 304 and/or 306. For example, application 304 can be configured to present long form (e.g., movie, television, etc.) media content. For example, application 304 can be a software application specifically configured to facilitate streaming movies and television shows to user device 302. Application 306 can be configured to present short form (e.g., amateur video, social media video, etc.) media content. For example, application 306 can be a software application configured to provide access to a social media website where the user of user device 302 can view and/or listen to media content created by other users of the social media website.

As another example, application 306 can be a software application configured to facilitate electronic messaging (e.g., instant messaging, SMS messaging, e-mail, etc.), that may include transmitting media content, between different user devices. The user of user device 302 may interact with application 304 and/or application 306 to select a media content item and cause application 304/306 to present GUI 100 and/or GUI 200, described above, on the display of user device 302.

Media Playback Session Management

In some implementations, user device 302 can include media session manager 316. For example, media session manager 316 can manage multiple, simultaneous media sessions on user device 302. By managing multiple, simultaneous sessions, media session manager 316 enables user device 302 to present multiple different media items at multiple different playback devices (e.g., local playback device, remote playback device, user device, etc.) simultaneously.

Figure 4:
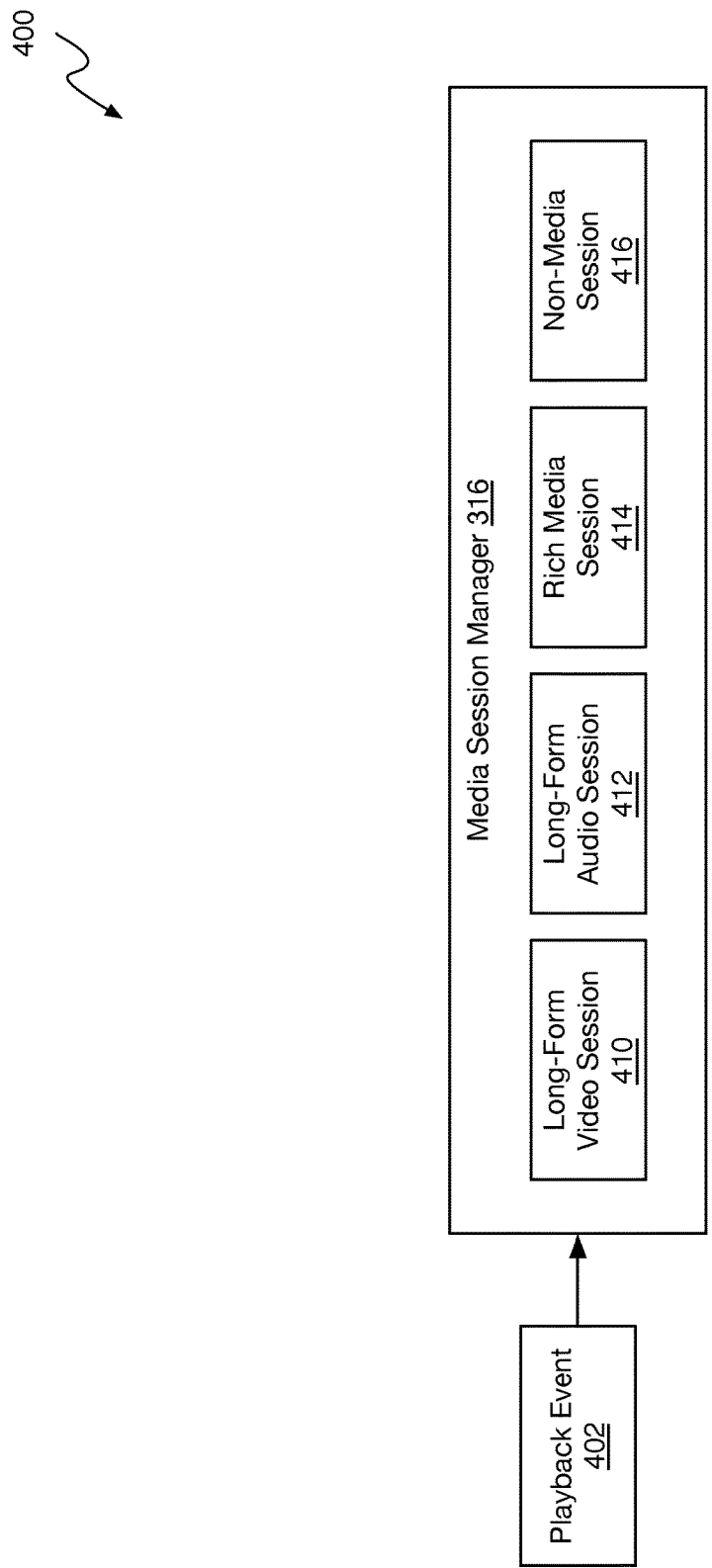
FIG. 4 is a block diagram of an example system for managing media sessions.

FIG. 4 is a block diagram of an example system 400 for managing media sessions. For example, system 400 can correspond to system 300 described above. System 400 can include media session manager 316. In some implementations, media session manager 316 can associate media applications (e.g., application 304, application 306) and/or media content with different types of media playback sessions. For example, media session manager 316 can manage long-form video sessions, long-form audio sessions, rich media sessions, and/or non-media sessions.

In some implementations, each media playback session can store data that defines the playback session. For example, a media playback session data can include data that identifies the media application associated with the playback session that most recently presenting media content. The media playback session data can include data that identifies a playback destination (e.g., local playback device, remote playback device, etc.) for the media playback session. In some implementations, if the user changes the playback destination for a playback session, media session manager 316 will terminate current playback session and a new playback session will be created that routes the selected media item to the new playback destination. The media playback session data can include data that identifies the type of the media playback session (e.g., long-form video, long-form audio, rich media, non-media, etc.).

The media playback session data can include data that identifies a time when the last playback event associated with the media session occurred. For example, the last playback event can be a playback termination event, a playback start event, a playback communication or transmission, the presentation of content, or other event associated with playing content on a playback device. In some implementations, the time of the last playback event can be used by media session manager 316 to determine when to terminate the media playback session. For example, media session manager 316 can automatically terminate a media playback session after a period of time (e.g., 3 hours) has elapsed since the time of the last playback event. The media playback session data can include data that identifies an established network connection (e.g., Wi-Fi, Bluetooth, etc.) between user device 302 and the identified playback device, if the network connection has been established.

In some implementations, media session manager 316 can manage a media playback session associated with long-form video content and/or applications. For example, movies, television shows, etc., can be classified as long-form video content. Media applications that provide access to, or play, movies, television shows, etc., can be classified as long-form video applications. When a user invokes (e.g., playback event 402) a long-form video media application (e.g., a movie application, television show application, etc.) or selects (e.g., playback event 402) a long-form video media item for playback, media session manager 316 can create a new long-form video session (e.g., long form video session 410) to manage the playback and/or presentation of the long form video content.

In some implementations, media session manager 316 can manage a media playback session (e.g., long-form audio session 412) associated with music content and/or music applications. For example, music media items presented by music focused software applications can be classified as long-form audio media content. Media applications that provide access to, or play, commercial music, can be classified as long-form audio applications. When a user invokes (e.g., playback event 402) a long-form audio media application or selects (e.g., playback event 402) a long-form audio media item for playback, media session manager 316 can create a new long-form audio session (e.g., long-form audio session 412) to manage the playback and/or presentation of the long-form audio content.

In some implementations, media session manager 316 can manage a media playback session (e.g., rich media session 414) associated with media content and/or applications not specifically focused on long-form video and/or long-form audio. For example, audio and/or video media items presented by software applications that are focused on textual content that is enhanced by audio and/or video content would fall into the rich media session category. For example, a news application that presents textual news related content and that may include audio and/or video content to enhance the news presentation can be classified as a rich media application that provides rich media content. A general-purpose media application, such as a web browser could be classified as a rich media application since a browser is not specifically focused on providing or presenting long-form video and/or long-form audio content. As another example, social media applications are generally not specifically focused on presenting long-form video and/or long-form audio content and would therefore be classified as a rich media application that provides rich media content. When a user invokes (e.g., playback event 402) a rich media application or selects (e.g., playback event 402) a rich media item for playback, media session manager 316 can create a new rich media session (e.g., rich media session 414) to manage the playback and/or presentation of the rich media content.

In some implementations, media session manager 316 can manage a media playback session (e.g., non-media session 416) associated with non-media audio and/or video. For example, audio and/or video presented by communication focused software applications (e.g., chat, messaging, video conferencing, telephone, etc.) that are focused on real-time audio and/or video content can be managed using a non-media playback session. When a user invokes (e.g., playback event 402) a non-media application or initiates (e.g., playback event 402) a real-time audio and/or video communication, media session manager 316 can create a new non-media session (e.g., non-media session 416) to manage the presentation of the non-media content.

Multiple Simultaneous Playback Sessions

In some implementations, playback sessions can be configured to present media content items simultaneously. For example, long-form video session 410, long-form audio session 412, rich media session 414, and non-media session 416 are examples of different types of media sessions. A user can provide input (e.g., select a movie to play) to initiate a long-form video session 412 on user device 302. A user can provide input (e.g., select a song to play) to initiate a long-form audio session 410 on user device 302. As described herein, the user can provide input to user device 302 to specify the destination playback device (e.g., user device 302, remote playback device, etc.) for the media content associated with a playback session. If the destination playback device (e.g., playback device 340) for long-form video session 410 is different than the destination playback device (e.g., playback device 330) for long-form audio session 412, then user device 302 can cause the respective long-form video playback session 410 and long-form audio playback session to play their respective media items simultaneously on the corresponding destination devices. For example, user device 302 can cause a selected movie to be presented on playback device 340 while simultaneously causing a selected song to be presented on playback device 330.

Interrupting a Playback Session

In some implementations, playing a selected content item can interrupt a current playback session. For example, once a playback device is selected for a particular type of playback session, media applications and/or content associated with the particular type of playback session can be routed to the selected playback device for the duration of the playback session or until the user selects a different playback device. Thus, if the user of user device 302 selects playback device 360 for presenting media content associated with rich media session 414, then the media content provided by all rich media applications will be routed to playback device 360 for presentation to the user until the rich media session 414 terminates or until the user selects a different playback device for rich media session 414.

In some implementations, media session manager 316 manages only one playback session of a particular session type at a time. For example, if a long-form video session 410 is in progress and user device 302 receives user input selecting a new long-form video application or long form video content item, media session manager 316 will not create a new long form video playback session. Instead, media session manager 316 may interrupt the playback of the media item corresponding to the current long-form video session 410, reconfigure long form video session 410 based on the newly selected long-form video application and/or long-form video content item, and then initiate playback of the new long-form video content item on the same playback device that was previously presenting the previous long-form video content item.

In some implementations, media session manager 316 can manage multiple playback session of a particular type at a time. For example, if a long-form video session 410 is in progress and user device 302 receives user input selecting a new long-form video application or long form video content item, media session manager 316 can create a new long form video playback session and manage both active long-form video playback sessions simultaneously. For example, media session manager 316 may route the long-form video content of the first long-form video playback session to one playback device for presentation of the content while routing the long-form video content of the second long-form video playback session to a different playback device for presentation of the content. Thus, user device 302 can cause different content associated with the same playback session type to be presented by two different playback devices simultaneously.

In some instances, the first playback session may not be an active session (e.g., no content is being played or routed but the session has not been terminated yet), while the second playback session may be an active session where content is being routed to, and presented by, a playback device. Thus, multiple playback sessions of the same type may exist, but only one of the sessions may be an active playback session.

In some implementations, playing a selected content item associated with a first playback session type can interrupt a current playback session corresponding to a second playback session type. For example, if a long-form audio content item associated with long-form audio session 412 is currently being routed to playback device 340 and the user initiates a long form video session 410 that is configured to route video playback to playback device 340, then user device 302 may interrupt the long-form audio playback session 412 so that the video playback session 410 can present a long form video on playback device 340. However, in some instances, it may be preferable to avoid interrupting the playback of the long-form audio session 412 on playback device 412. For example, if, instead of a long-form video, the user has selected to initiate a rich media session by selecting a rich media item provided by a social media application, the user may not want to interrupt the playback of the long-form audio item with the presentation of the rich media item and instead may prefer to consume the rich media item locally on user device 302. Thus, user device 302 can be configured with criteria that can be evaluated to determine when playing a media content item should or should not interrupt the current playback of another content item. In some implementations, media session manager 316 can be configured with various rules or criteria for determining when to interrupt the presentation of a media content item associated with a media playback session. For example, a media content item selected for playback by a user of user device 302 will either be played on a remote playback device or on the local playback device (e.g., user device 302 and/or personal listening devices, e.g., headsets, earphones, earbuds, etc., connected to user device 302). If, after evaluating the criteria described below, media session manager 316 determines that the playback of a content item on a remote device should not be interrupted by the playback of a newly selected content item, then media session manager 316 can cause the playback of the newly selected content item to be presented on the local playback device. If the local playback device is already presenting a media item, then the currently presented media item can be interrupted so that the newly selected media item can be presented to the user according to the user's wishes.

In some implementations, the remote playback interrupt criteria can include whether the selected media item is provided by a media application included on a black list of media applications. For example, media session manager 316 can be configured with a black list of application identifiers that identify media applications that should never interrupt a remotely playing media session or media content item. When determining whether to interrupt a remote media playback session, media session manager 316 can compare the application identifier of the media application providing the newly selected media item to the application identifiers in the black list. If the application identifier is included in the black list, then the remotely playing media session will not be interrupted and the newly selected media item can be played locally on user device 302. If the application identifier is not included in the black list, then the remotely playing media session may be interrupted (e.g., pending evaluation of other criteria described herein) and the newly selected media item may be presented on the remote playback device.

In some implementations, the remote playback interrupt criteria can include whether the selected media item is provided by a media application included on a white list of media applications. For example, media session manager 316 can be configured with a white list of application identifiers that identify media applications that should always interrupt a remotely playing media session or media content item. When determining whether to interrupt a remote media playback session, media session manager 316 can compare the application identifier of the media application providing the newly selected media item to the application identifiers in the white list. If the application identifier is included in the white list, then the remotely playing media session will be interrupted and the newly selected media item will be played on the remote playback device. If the application identifier is not included in the white list, then the remotely playing media session may or may not be interrupted (e.g., pending evaluation of other criteria described herein) and the newly selected media item may or may not be presented on the remote playback device.

In some implementations, the remote playback interrupt criteria can include whether the selected media item is provided by a media application that is determined to be an important media application. For example, media session manager 316 can be determine whether a media application is important based on various indicia of importance. One example of an indicator of importance is whether the media application providing the selected media item participates in operating system level user interface features, such as a playback status and control user interface provided by the operating system of user device 302 and/or remote-control functionality provided by user device 302. A second example of an indicator of importance is whether the media application is entitled to present audio content while running as a background application. If any of these indicia are observed (e.g., the media application participates in operating system functionality and/or is entitled to present audio content while running as a background application), then the remotely playing media session can be interrupted and the newly selected media item can be played on the remote playback device.

In some implementations, the remote playback interrupt criteria can include whether the media application providing the selected media item has indicated that the media application is a long-form video application and/or a long-form audio application. For example, the media application can be configured to interact with an application programming interface of the operating system of user device 302 to provide information indicating that the media application is a long-form video application and/or long-form audio application. If the media application is a long-form video application and/or long-form audio application, then the remotely playing media session can be interrupted and the newly selected media item provided by the media application can be played on the remote playback device.

In some implementations, the remote playback interrupt criteria can be evaluated according to a priority or hierarchy of criteria. For example, the results of the white list evaluation can take priority over the results of the black list evaluation. The black list evaluation can take priority over the application importance evaluation.

In some implementations, the white list can be configured to include long-form video applications and/or long-form audio applications, including the applications that use the application programming interface described above. In some implementations, the white list can be dynamically generated based on historical user behavior patterns that indicate which media applications should interrupt remote playback of media items provided by other media applications.

In some implementations, user input supersedes all rules and criteria for interrupting remote playback. For example, if a user provides user input that explicitly indicates that the user wants a media content item to be presented on a particular remote playback device, then media session manager 316 will configure the corresponding playback session to route the selected content item to the specified remote playback device regardless of what media content item is currently playing and will be interrupted on the specified remote playback device.

In some implementations, application 306 may be associated with a higher level of privacy protection than application 304. For example, when application 306 corresponds to a social media application, electronic messaging application, etc., media content processed by application 306 is likely to be of a more personal nature than the media content processed by application 304, which processes professionally produced long-form media content accessible to the wider public. The privacy protection level associated with the application presenting the media content selected by the user can be considered when automatically routing media content to playback devices, as described further below.

Scoring Playback Devices

In some implementations, user device 302 can include scoring module 308. For example, scoring module 308 can be configured to generate predictive scores for playback devices accessible to user device 302. In some implementations, scoring module 308 can be included in the operating system (OS) of user device 302. Scoring module 308 can be configured as a rules-based system that compares playback context data (described below) to a set of rules for determining predictive scores for the various playback devices. Scoring module 308 can be configured as a machine learning model that processes the playback context data to generate predictive scores for the various playback devices.

In some implementations, scoring module 308 can generate the predictive scores in response to a user selecting a media content item for playback. For example, because the scoring process may take into account the type of media content that the user has selected for playback, the scoring process may be performed after the user has selected a media content item for playback but, preferably, before the user has selected to initiate playback of the media content item.

Before generating the predictive scores, scoring module 308 can obtain information identifying the playback devices currently available on network 320. For example, playback devices 330, 340, 360 can periodically broadcast messages indicating (e.g., advertising) their availability. These messages can be broadcast using peer-to-peer communication technology (e.g., Bluetooth, peer-to-peer Wi-Fi, etc.). The messages can include information that a receiving device (e.g., user device 302) can use to establish a connection with the broadcasting playback devices through network 320. User device 302 can store the information indicating which playback devices are available or accessible through network 320. Scoring module 308 can obtain the information indicating which playback devices are available or accessible through network 320 when generating the predictive scores for the playback devices.

In some implementations, scoring module 308 can generate predictive scores for the available playback devices. In some implementations, the available playback devices may include the local playback device (e.g., user device 302). Thus, scoring module 308 can generate predictive scores for remote playback devices 330, 340, and 360 and/or user device 302.

Scoring module 308 can generate the predictive scores based on scoring attributes that correspond to playback context data and/or historical user patterns of behavior. When implemented as a rules-based scoring system, scoring module 308 can assign individual scores to each scoring attribute and then combine the scores into an overall predictive score. When implemented as a machine learning model, the scoring attributes can correspond to the features used to create the machine learning model. The values of the scoring attributes at the time when the user selects a content item for playback can be fed into the machine learning model to generate the predictive score for each playback device based on a holistic analysis of the current playback context in view of historical user behavior. In some implementations, the machine learning module can generate list of playback devices ordered most-likely to be selected by the user to least likely to be selected by the user without associating each playback device with a predictive score. For example, when automatically routing media content to a playback device, user device 302 can select the most-likely playback device from the ordered list. When presenting playback devices for user selection, the ordered list of playback devices can be presented so that the user can view the most likely playback devices first.

Scoring Playback Devices Based on Context

In some implementations, the scoring attributes can include contextual attributes corresponding to the current playback context. The current playback context can include a local playback context associated with user device 302. In some implementations, the local playback context of user device 302 can include contextual attributes that are local to user device 302. For example, local contextual attributes can be contextual attributes, context data, etc., that user device 302 does not have to obtain from other playback devices.

Local Playback Context

In some implementations, the local contextual attributes can include characteristics of the media content item selected by the user. In some implementations, the characteristics can include whether the media content item is a long-form or a short-form content item. For example, a user may be more likely to send long-form content items to a remote playback device, thus a higher predictive score may be generated for remote playback devices than the local playback device when a long-form content item is selected. Inversely, a user may be more likely to play short-form content items on the local playback device, thus a higher predictive score may be generated for user device 302 than a remote playback device when a short-form content item is selected.

In some implementations, the content item characteristics can include the type of media content selected by the user. For example, the type of media content can include audio/ video content (e.g., movies, television shows, short videos, etc.). Scoring module 308 may generate a lower predictive score for playback devices that can only present audio (e.g., smart speakers) than for playback devices that can present audio and video (e.g., smart televisions, set-top-boxes, etc.) when an audio/video content item is selected. As another example, the type of media content can include audio only content (e.g., music, podcasts, audio books, radio broadcasts, etc.). Scoring module 308 may generate a higher predictive score for playback devices that can only present audio (e.g., smart speakers) than for playback devices that can present audio and video (e.g., smart televisions, set-top-boxes, etc.) when an audio only content item is selected.

The content item characteristics can include ratings associated with the selected media content item. For example, the ratings can include parental guidance ratings that indicate the maturity level of the content, whether the content includes depictions of violence, sexuality, or other scenes, language, etc., intended for mature audiences. For example, the content item ratings information combined with the time of day may influence the predictive score generated by scoring module 308. For example, a content item having adult content selected in the evening (e.g., after 9 pm) may result in higher predictive scores for remote playback devices than an adult content item selected in the morning or middle of the day when children may be awake and near one of the remote playback devices. A content item rated for children (e.g., G rating, PG rating, etc.) selected during the day (e.g., before 6 pm) may result in higher predictive scores for remote playback devices than a content item rated for adults selected during the day when the children are around to view and/or hear the adult content presented by the remote playback devices.

The content item characteristics can include the genre of the content item. Similar to the discussion of ratings above, some genres (e.g., cartoons, educational television for children, etc.) may be more appropriate for children while some genres (e.g., action movies, dramas, etc.) may be more appropriate for adults. Genre combined with other scoring attributes (e.g., time of day) and/or historical playback behaviors may result in a higher or lower predictive score for the playback devices.

The content item characteristics can include the content item identifier. For example, user device 302 may store historical data (e.g., historical data 310) that identifies various scoring attributes and historical user behavior with respect to sending media content from user device 302 to remote playback devices. If the historical data indicates a pattern of sending content items having a specific identifier (e.g., television show name, movie title, etc.) to remote playback devices, then when a user selects a content item having the specific identifier, scoring module 308 can generate a higher predictive score for a remote playback device than for the local user device 302. The use of historical data (e.g., historical user behavior data) for generating predictive scores is discussed in greater detail below.

The content item characteristics can include the resolution of the selected content item. For example, the user may be more likely to send high resolution content (e.g., 4 k video, high definition audio, etc.) to a remote playback device that can accurately present the high-resolution content than to play the high-resolution content on a user device that may have a small display and small speakers. Thus, the selection of high-resolution content may result in higher predictive scores for playback devices that can handle the high-resolution content.

The content item characteristics can include the source of the selected media item. For example, the source can correspond to the application through which the user has selected the media item. The source can correspond to the network resource (e.g., network server, website, etc.) from which the selected media item was obtained. For example, when the source is a short-form media source (e.g., video sharing website or application), or a media source that is of a more personal or private nature to the user (e.g., social media website or application), scoring module 308 may generate a predictive score for remote playback devices that is smaller than the predictive score for the local playback device because the user may be less likely to want to present content from these types of sources on remote playback devices where other people can see or hear the content. For example, applications 304 and/or 306 may be associated with a privacy level that indicates the personal nature of the content provided by the applications. When the privacy level is high (e.g., the application provides content of a highly personal nature), then scoring module 308 may generate predictive scores that favor presenting the content on the local user device 302. When the privacy level is low (e.g., the application provides content that is not personal to the user), then scoring module 308 may generate predictive scores that favor presenting the content on a remote playback device 330, 340, or 360. When the source is a long-form media source (e.g., television or movie streaming website or application) or a source of professionally produced media (e.g., music streaming website or application), scoring module 308 may generate a predictive score for remote playback devices that is higher than the predictive score for the local playback device. Of course, the predictive scores generated for playback devices generated from these content item characteristics may be adjusted higher or lower based on user historical data indicating that the user typically does or does not stream content from these sources to the various playback devices.

In some implementations, the local contextual attributes can include the location of user device 302 as determined by user device 302. For example, the location can include a geographic location, such as the user's home, office, school, etc. The geographic location can include grid coordinates, latitude/longitude location, etc.

In some implementations, the location of user device 302 can include pinpoint locations identified or defined by a combination of signals received by user device 302. For example, these signals can include radio frequency signals (e.g., Wi-Fi signals, Bluetooth signals, etc.), the sources of these radio signals (e.g., Wi-Fi access points, Bluetooth broadcasting devices, media playback devices, etc.), and/or the received signal strength of these signals. These signals can include audio signals detected by the microphone of user device 302. For example, different locations, rooms, buildings, etc., have different ambient noise and/or acoustical characteristics. When the ambient noise and/or acoustical characteristics of a location are detected by user device 302, the ambient noise and/or acoustical characteristics may be used to define and/or identify a pinpoint location. Other signals defining a pinpoint location can include user activities performed at a location. For example, a user may typically send media content to a particular playback device (e.g., playback device 360) when at or near a specific pinpoint location. User device 302 can combine the various signals above to define a pinpoint location or determine that the user is located at a previously defined pinpoint location. The pinpoint location can then be used to determine a predictive score for the various playback devices based on the proximity of user device 302 to the playback devices (e.g., are the devices in the same room, are the devices in the same building, is the user device in front of or near a playback device, etc.), historical use of the playback devices when user device 302 was previously at the pinpoint location, and/or based on some other combination of scoring attributes, as described herein.

In some implementations, the location of user device 302 can be evaluated by scoring module 308 in combination with historical user behaviors. For example, if the user has previously sent media content from user device 302 to playback device 340 when located at the current pinpoint location, then scoring module 308 may generate a higher predictive score for playback device 340 than for other playback devices. If there is a historical pattern that indicates that the user typically sends media content to playback device 360 when user device 302 is at or near a particular location, then scoring module 308 may generate a higher predictive score for playback device 360 than for other playback devices.

In some implementations, the local contextual attributes can include the current temporal contextual attributes. For example, the current temporal contextual attributes can include the current time of day when scoring module is generating the predictive score, the current day of the week when scoring module is generating the predictive score, or a combination thereof.

The current temporal contextual attributes can include a time of day irrespective of day of the week or date. For example, the user of user device 302 may have a home gym in a room at home. The user may typically exercise at 6 am daily and send media content from user device 302 to playback device 340 while the user exercises. This time of day-based pattern can be determined by scoring module 308 and be used to generate a higher predictive score for playback device 340 at 6 am than at other times of the day.

The current temporal contextual attributes can include a day of the week (e.g., Monday, Tuesday, etc.) irrespective of time of day. For example, a user of user device 302 may typically send music to playback devices 330, 340, and 360 (e.g., the whole house) on the weekend as the user is relaxing around their home. Scoring module 308 can determine this day of week-based pattern and generate a higher predictive score for playback devices 330, 340, and 360 on Saturday and Sunday than on other days of the week. In some implementations, scoring module 308 can recognize the user pattern of grouping of playback devices 330, 340, and 360 for media playback on the weekends and automatically generate a playback group that includes playback devices 330, 340, and 360. In this case, scoring module 308 can generate a predictive score for the playback group as if the playback group was a single playback device.

The current temporal contextual attributes can include a combination of time and day. Continuing the examples above, the user may only exercise during the week Monday-Friday and rest on Saturday and Sunday. Thus, at 6 am Monday-Friday, scoring module 308 may generate a higher predictive score for playback device 340 than on Saturday and Sunday.

In some implementations, the local contextual attributes can include the current network attributes. For example, user device 302 may be connected to or may detect various networks near user device 302. These networks could include a home wired or wireless network of the user when the user is at home. These networks could include home wireless networks of the user's neighbors when the user is at home. These networks could include various wired or wireless office networks when the user is at work. User device 302 can detect signals (e.g., Wi-Fi signals, ethernet signals, etc.) generated by the networks and based on these signals determine corresponding network identifiers and received signal strengths. Based on this network information, user device 302 can determine the location of user device 302 and/or determine historical user playback behaviors that correspond to the combination of network signals detected by user device 302 at the time when scoring module 308 is generating the predictive scores for the playback devices. For example, scoring module 308 may determine that a particular combination of network signals and/or received signal strengths associated with network identifiers correlates to past user behavior of sending media content from user device 302 to playback device 330. Thus, scoring module 308 may generate a higher predictive score for playback device 330 than for other playback devices.

In some implementations, the local contextual attributes can include the schedule activity attributes. For example, user device 302 may include a calendar application through which the user can schedule and reserve time for various events, meetings, appointments, etc. An event scheduled in the calendar application may indicate a time and/or location where the event is to occur. When the current time corresponds to the scheduled time of the event, scoring module 308 can determine the location of the event and generate predictive scores for the various playback devices based on the location of the event. For example, the meeting location may be a conference room that includes remote playback device 340. If the user has previously sent media content from user device 302 to remote playback device 340 when in the conference room, then scoring module 308 can determine based on the location in the calendar entry that user device 302 is likely in the conference room and that the user would likely wish to send media content to remote playback device 340. Thus, scoring module 308 may generate a higher predictive score for playback device 340 than for other available playback devices.

Remote Playback Context

The current playback context can include a remote playback context associated with each of the available playback devices. For example, scoring module 308 can determine the remote playback device state associated with each of the available playback devices 330, 340, and/or 360, respectively, and determine the remote playback context based on the remote playback device states. Scoring module 308 can then generate predictive scores for each of the playback devices based on the current remote playback context.

In some implementations, user device 302 can obtain the current playback state for each of the available remote playback devices. For example, user device 302 can send a message through network 320 to playback devices 330, 340, and/or 360 requesting the current playback state of the playback devices. Each playback device 330, 340, and 360 can send their respective playback states to user device 302 in state messages 332, 342, and 362, respectively. Scoring module 308 can then determine the remote playback device contexts based on the playback state information received from each playback device. For example, the state information received from each playback device and/or the remote playback context may correspond to the remote contextual attributes described below.

In some implementations, the remote contextual attributes can include the capabilities of each available playback device. For example, some playback devices may be able to present audio and video. Other playback devices may be able to present only audio. Some playback devices may be able to present high definition video and/or audio, while other playback devices may be able to only present low definition media. Some playback devices may be able to participate in playback device groups, while other playback devices may only be able to operate individually. These playback device capabilities can influence the predictive scores generated for each device. For example, if the user has selected to play a high definition movie, then a playback device that can present high definition video will get a higher predictive score than a playback device that can only present low definition video or that can only present audio.

In some implementations, the remote contextual attributes can include the attributes describing the current playback state of the remote playback devices. For example, the remote device playback state may indicate which playback devices are currently presenting content and which are not. For example, some playback devices may be currently (e.g., actively) presenting media content, while other playback devices may be idle, in low power mode, or turned off. Scoring module 308 may generate a lower predictive score for playback devices that are currently in use than for playback devices that are not being used currently because the user of user device 302 may be less likely to want to interrupt the content being presenting on the playback devices that are currently presenting content.

The current playback state can identify where content playing on a playback device originated. For example, the media content being presented by a playback device may be originated or initiated at the playback device using applications installed on the playback device. Alternatively, the media content being presented by a playback device may be originated or initiated at another user device (e.g., user device 370) that is streaming or that has handed off the playback of media content to a playback device (e.g., playback device 330). In some implementations, scoring module 308 may generate a lower score for a playback device that is presenting content when the content playback was originated on the playback device than for a playback device that is receiving content from another user device. For example, if the content playback was initiated at the playback device 330, then the user of playback device 330 may be more likely currently engaged with (e.g., watching, listening to, etc.) playback device 330 and the user of user device 302 may not wish to interrupt the other user's enjoyment of playback device 330. In some implementations, scoring module 308 may generate a higher score for a playback device that is presenting content when the content playback was originated on the playback device than for a playback device that is receiving content from another user device.

The current playback state can identify the source and/or type of the media content currently being presented by playback devices. For example, the source can be an application running on the playback device that provides access to the media content. The source can be a network resource (e.g., website, server, etc.) from which the media content is being streamed. The type of media content can be short-form content or long-form content, as described above. For example, when the source is a short-form media source (e.g., video sharing website or application), scoring module 308 may generate a predictive score for the remote playback devices playing the short-form content that is higher than playback device presenting long-form because the user of user device 302 may be more likely to interrupt the playback of the short-form content (e.g., short amateur videos, social media content, etc.) presented on the playback device. When the source is a long-form media source (e.g., television or movie streaming website or application) or a source of professionally produced media (e.g., music streaming website or application), scoring module 308 may generate a predictive score for remote playback devices that is lower than the predictive score for playback devices presenting short-form content because the user of user device 302 may be less likely to want to interrupt another person's enjoyment of a movie, television show, or the like.

The current playback state can identify type of output provided by the content item being presented by playback devices. For example, the type of output can include video only, audio only, or audio and video output. Scoring module 308 can generate a predictive score for the playback devices by comparing type of output currently being presented by the playback devices to the type of output provided by the content item selected by the user of user device 302. For example, if the user of user device 302 has selected a movie with audio and video output and a playback device is presenting audio only output, then scoring module 308 may generate a higher predictive score for the playback device because the user of user device 302 may be more willing to interrupt the audio only playback with the movie the provides the audio and video output. If the user of user device 302 has selected a song with audio output only and a playback device is presenting audio/video output (e.g., a movie, television show, etc.), then scoring module 308 may generate a lower predictive score for the playback device because the user of user device 302 may be less willing to interrupt the audio/video content being presented by the playback device. Thus, scoring module 308 may be configured with a hierarchy or ranking of content output types (e.g., audio only, video only, audio/video, etc.) that can indicate when a selected content item having a specific content output type can or should interrupt a current playing content item having a different content output type. For example, audio only content can interrupt video only output, while audio/video content can interrupt audio only content. This hierarchy or ranking of output types can influence how scoring module 308 generates the predictive scores for each playback device, as described above.

Historical User Behavior

As mentioned above, in some implementations, historical user playback behavior (e.g., historical data) can influence the predictive scores generated by scoring module 308. For example, whenever a user selects and plays a content item, user device 302 can store in historical database 310 playback context data (e.g., context attribute values) obtained at the time when the user plays the content item. The playback context attributes can correspond to the contextual attributes (e.g., local, remote, etc.) described above. For example, the contextual attributes can include an identifier for the media application that provided the content item, an identifier for the selected playback device, the location of the user device when the content item was selected and/or played, the amount of time (e.g., duration) that the user consumed the selected content item, the time of day when the content item was played, and/or the day of the week that the content item was played.

Additionally, user device 302 can store the identification of the playback device selected by the user for presentation of the selected content item. For example, if the user chooses to play the content item on user device 302 (e.g., by not selecting a remote device, by selecting the local device), then user device 302 can store information identifying the local playback device in association with (e.g., mapped to) the playback context data obtained and stored for the current content playback. If the user chooses to send the playback of the selected content item to a remote playback device, user device 302 can store the identifier of the remote playback device in historical database 310 in association with the playback context for the current content playback.

In some implementations, the historical playback data 310 can be used by scoring module 308 to determine patterns of behavior (e.g., patterns of use) related to the various playback devices (e.g., including user device 302) available in system 300. These patterns of use may allow scoring module 308 to generate higher scores for playback devices that are more likely to be used by the user of user device 302 in specific playback contexts. For example, if the user's historical behavior indicates that the user typically presents media content on playback device 330 in a specific playback context (e.g., when a specific combination of context attribute values are present) and the specific playback context corresponds or nearly corresponds to the current playback context, then scoring module 308 can generate a higher predictive score for playback device 330 than for other playback devices available through network 320.

In some implementations, scoring module 308 can analyze the historical playback data 310 to determine the most recently used playback device and/or the most frequently used playback device. For example, scoring module 308 can determine the most recently used playback device and/or the most frequently used playback devices and generate higher predictive scores for the most recently used playback device and/or the most frequently used playback devices than for other less used playback devices.

When scoring module 308 is configured as a rules-based scoring module, then the historical patterns can influence how the scores are generated for each contextual attribute. When scoring module 308 is configured as a machine learning module, the historical data 310 can be used to train the machine learning model to improve the predictive scores generated by the machine learning model. The historical usage patterns will influence the machine learning model such that the machine learning module will generate higher predictive scores for playback devices that a user will typically use in particular playback context.

In some implementations, the influence of the historical data can be diminished over time. For example, scoring module 308 can generate predictive scores such that recent user behaviors have more influence on the predictive scores than less recent user behaviors. The diminishing (e.g., aging) of older behavioral data can be accomplished by weighting the scores generated for each contextual attribute to give more weight to recent behaviors that older behaviors. The diminishing of older behavioral data can be accomplished by retraining the machine learning model using more recent historical data 310.

Disqualification of Playback Devices

In some implementations, remote playback devices can be disqualified from automatic playback selection. For example, scoring module 308 can be configured with rules that indicate when a remote playback device should be disqualified from automatic selection for playback of media content. When a remote playback device is disqualified, scoring module 308 may generate a low predictive score for the remote playback device so that the remote playback device will not be automatically selected for playback of media content.

In some implementations, a disqualification rule can be based on whether the user has previously selected to send media content from user device 302 to a remote playback device. For example, if the user always plays content selected on user device 302 and has never sent content from user device 302 to any playback device, then all remote playback devices may be disqualified from receiving media content from user device 302. As another example, if the user has never sent any content from user device 302 to a particular remote playback device (e.g., playback device 340), then the particular remote playback device may be disqualified from receiving media content from user device 302.

In some implementations, a disqualification rule can be based on the capabilities of the remote playback device. For example, if the user has selected to play content having audio and video output and remote playback device 360 is only capable of presenting audio content, then remote playback device 360 can be disqualified from automatic selection.

In some implementations, a disqualification rule can be based on the current playback state of a remote playback device. For example, if the remote playback device is currently playing media content, or a particular type of media content, then the remote playback device can be disqualified from automatic selection.

In some implementations, scoring module 308 can classify playback devices based on their predictive scores. For example, after scoring module 308 generates predictive scores for each playback device (e.g., user device 302, playback device 330, playback device 340, and playback device 360) based on the playback context attributes and/or historical data 310, scoring module 308 can classify playback devices into high, medium, and low score classes. For example, the classes can represent a confidence level (e.g., high, medium, low, etc.) corresponding to how confident the scoring module 308 is that the user will want to present the selected content item on the corresponding playback device. Playback devices that have predictive scores above a first threshold value (e.g., 50, 70, 81, etc.) can be grouped into a high class corresponding to playback devices to which the user is highly likely to send the selected content item. Playback devices that have predictive scores below the first threshold value and above a second threshold value (e.g., 30, 45, etc.) can be grouped into a medium class corresponding to playback devices to which the user may wish to send the selected content item. Playback devices that have predictive scores below the second threshold value can be grouped into a low class corresponding to playback devices to which the user is unlikely to send the selected content item.

Automatic Selection of Playback Devices

In some implementations, user device 302 can automatically select a playback device based on the classification of the playback devices. In some implementations, user device 302 will only automatically select a playback device for long-form video playback sessions. In other implementations, user device 302 can automatically select playback devices for long-form video, long-form audio, rich-media, and/or non-media playback sessions. For example, after scoring module 308 generates the predictive scores for each playback device (e.g., user device 302, playback device 330, playback device 340, playback device 360, etc.) and classifies each playback device, scoring module 308 can automatically select a playback device to which to send the user selected content item. In some implementations, scoring module 308 can select a playback device from among the playback devices in the high class of playback devices. Since the predictive score threshold value for the high class is a high value, few, if any, of the playback devices will be in the high class. If one playback device is in the high class, then scoring module 308 can automatically select the playback device. If more than one playback device is in the high class, then scoring module 308 can automatically select the playback device in the high class that has the highest predictive score. If there are no playback devices in the high class, then scoring module 308 can select the local playback device (e.g., user device 302) by default or cause user interface (UI) module 312 to prompt the user to select a playback device, as described further below.

When a playback device is automatically selected by scoring module 308, scoring module 308 can send an identifier for the selected playback device to UI module 312 and the identifiers for all available playback devices and corresponding predictive scores. UI module 312 can then generate the graphical user interfaces (e.g., GUI 100, GUI 200) that the user can interact with to initiate playback of the selected content item, as described above. For example, UI module 312 can generate GUI 100 and present the identifier of the selected playback device (e.g., remote playback device 340) on graphical element 106. Thus, when a user selects play button 104 the selected content item can be automatically routed to the automatically selected playback device (e.g., remote playback device 340) without additional input from the user to select the playback device.

If the user wishes to select a different playback device than the automatically selected playback device, the user can select graphical element 106 to cause available playback devices to be presented on graphical element 202, as described above. In some implementations, this user behavior can be recorded in the historical data and may be used to influence future scoring for the automatically selected playback device. For example, this behavior may cause scoring module 308 to score the automatically selected playback device lower and/or score the user selected playback device higher. High and medium class playback devices presented on graphical element 202 can be grouped and/or ordered on graphical element 202 according to their respective predictive scores. Low class playback devices presented on graphical element 202 can be grouped and/or ordered alphabetically, as illustrated in FIG. 2.

Ordering Playback Devices for Presentation

In some implementations, user device 302 can prompt the user to select a playback device. For example, if there are no playback devices in the high class and at least one playback device in the medium class, UI module 312 can prompt the user to select a playback device by presenting graphical element 202. Scoring module 308 can, for example, send identifiers for the available playback devices and their respective predictive scores to UI module 312. Since a high class playback device has not been identified, UI module 312 can present graphical element 202 when the user selects play button 104. As described above, medium class playback devices presented on graphical element 202 can be grouped and/or ordered on graphical element 202 according to their respective predictive scores. Low class playback devices presented on graphical element 202 can be grouped and/or ordered alphabetically, as illustrated in FIG. 2. By grouping the medium class playback devices together in a quickly accessible location on graphical element 202, the user can quickly and efficiently find the playback devices that the user is most likely to select for playback of the selected content item.

Default Behavior

In some implementations, user device 302 can automatically select the local playback device (e.g., user device 302) as the playback device. For example, when all of the available playback devices are associated with the low class (e.g., they all have low predictive scores), user device 302 can select user device 302 as the playback device. UI module 312 can indicate on graphical element 106 that user device 302 is the selected playback device. When the user selects the play button 104 to initiate playback of the selected content item, user device 302 can automatically begin presenting the content item on user device 302 without prompting the user for a playback device selection.

Again, if the user wishes to select a different playback device than the automatically selected playback device, the user can select graphical element 106 to cause available playback devices to be presented on graphical element 202, as described above. In some implementations, based on this user behavior (e.g., selecting a playback device other than the automatically selected playback device), scoring module 308 can correspondingly change the scoring of the user selected playback device and the automatically selected playback device (e.g., user device 302). In this case, since all of the playback devices have been classified as low class devices, the playback devices presented on graphical element 202 can be grouped and/or ordered alphabetically.

Figure 5:
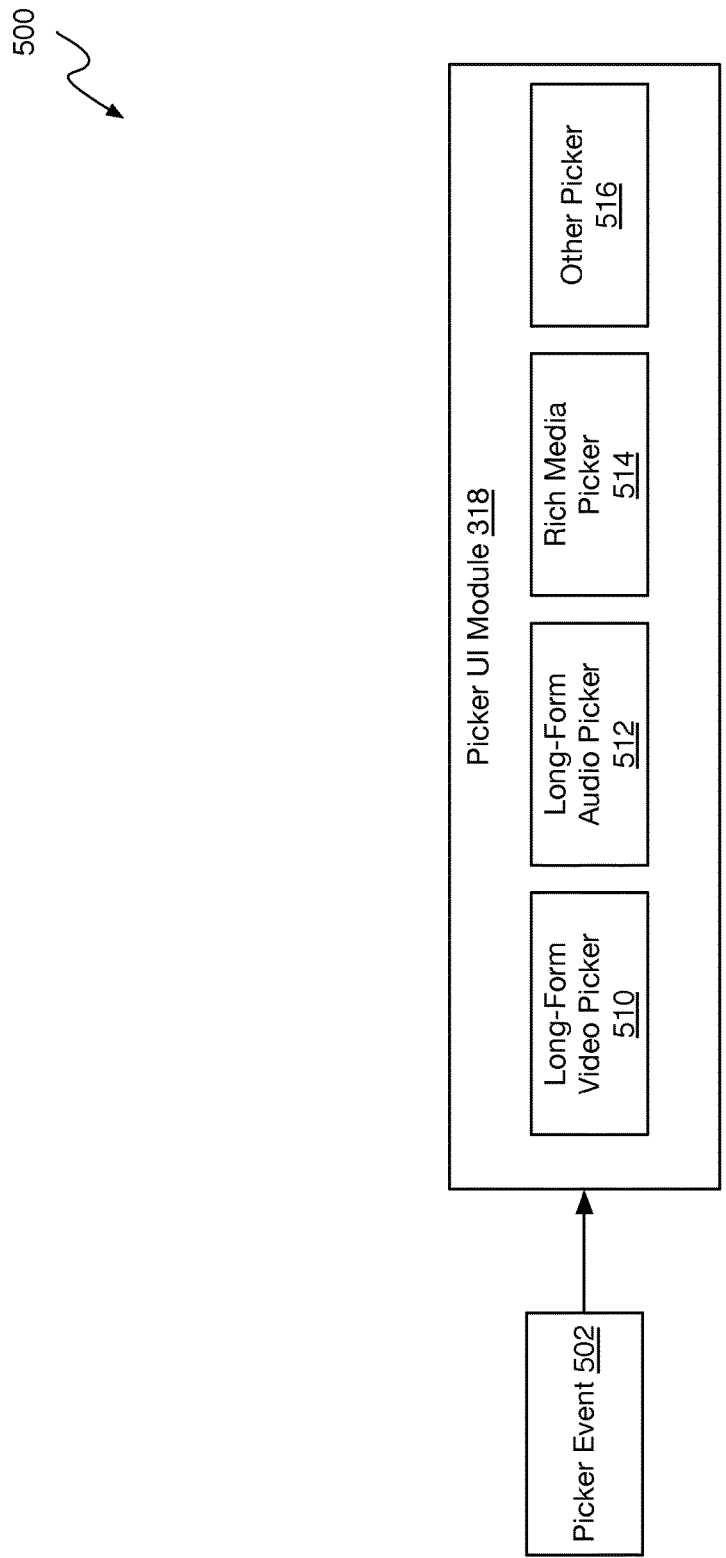
FIG. 5 is a block diagram of an example system for generating a destination playback device prompt.

FIG. 5 is a block diagram of an example system 500 for generating a destination playback device prompt. For example, system 500 can correspond to system 300 described above. User device 302 of system 300/500 can include picker user interface (UI) module 318. Picker UI module 318 can be configured to generate graphical element 202 of GUI 200 in response to a request (e.g., picker event 502) from UI module 312 to generate and present graphical element 202 (e.g., a playback destination picker user interface).

In some implementations, picker UI module 318 can generate different picker user interfaces (e.g., graphical element 202) for different media applications and/or user selected media content items. As described above, each media application and/or media content item can be associated with a different type of playback session. When generating the picker user interface for receiving user input selecting a playback device, picker UI module 318 can generate a playback device picker user interface based on the playback session type associated with the media content item and/or the media application with which the user is currently interacting. For example, if the media application and/or selected media content item corresponds to movies, then picker UI module 318 can generate a long-form video session picker 510. If the media application and/or selected media content item corresponds to long-form audio, then picker UI module 318 can generate a long-form audio session picker 512. If the media application and/or selected media content item corresponds to rich media, then picker UI module 318 can generate a rich media session picker 514.

In some implementations, picker module 318 can include other picker 516. For example, other picker 516 can be a picker associated with other types of content that may be streamed to and/or presented by a playback device. For example, other picker 516 may be a picker that allows the user to select a playback device for mirroring (e.g., presenting on playback device and user device 302 simultaneously) video presented on user device 302. Other picker 516 may be a picker that allows the user to select a playback device for presenting real-time audio and/or video associated with a communication application running on user device 302.

In some implementations, picker module 318 can generate the collection of playback devices presented on the picker based on the type of picker generated for the media application and/or selected media content item. For example, the playback devices that are scored and/or selected for presentation on the long-form video picker 510 can be limited to the playback devices that are capable of presenting long-form video and/or have previously been selected by the user for presentation of long-form video. Similarly, the playback devices that are scored and/or selected for presentation on the long-form audio picker 512 can be limited to the playback devices that are capable of presenting long-form audio and/or have previously been selected by the user for presentation of long-form audio. The playback devices that are scored and/or selected for presentation on the rich media picker 514 can be limited to the playback devices that are capable of presenting rich media content items and/or have previously been selected by the user for presentation of rich media content items. After the picker UI module 318 has received the user's selection of a playback device from one of the playback device pickers, picker UI module 318 can send the selected playback device to UI module 312 and the selected content item can be routed to the user selected playback device, as described herein.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 6:
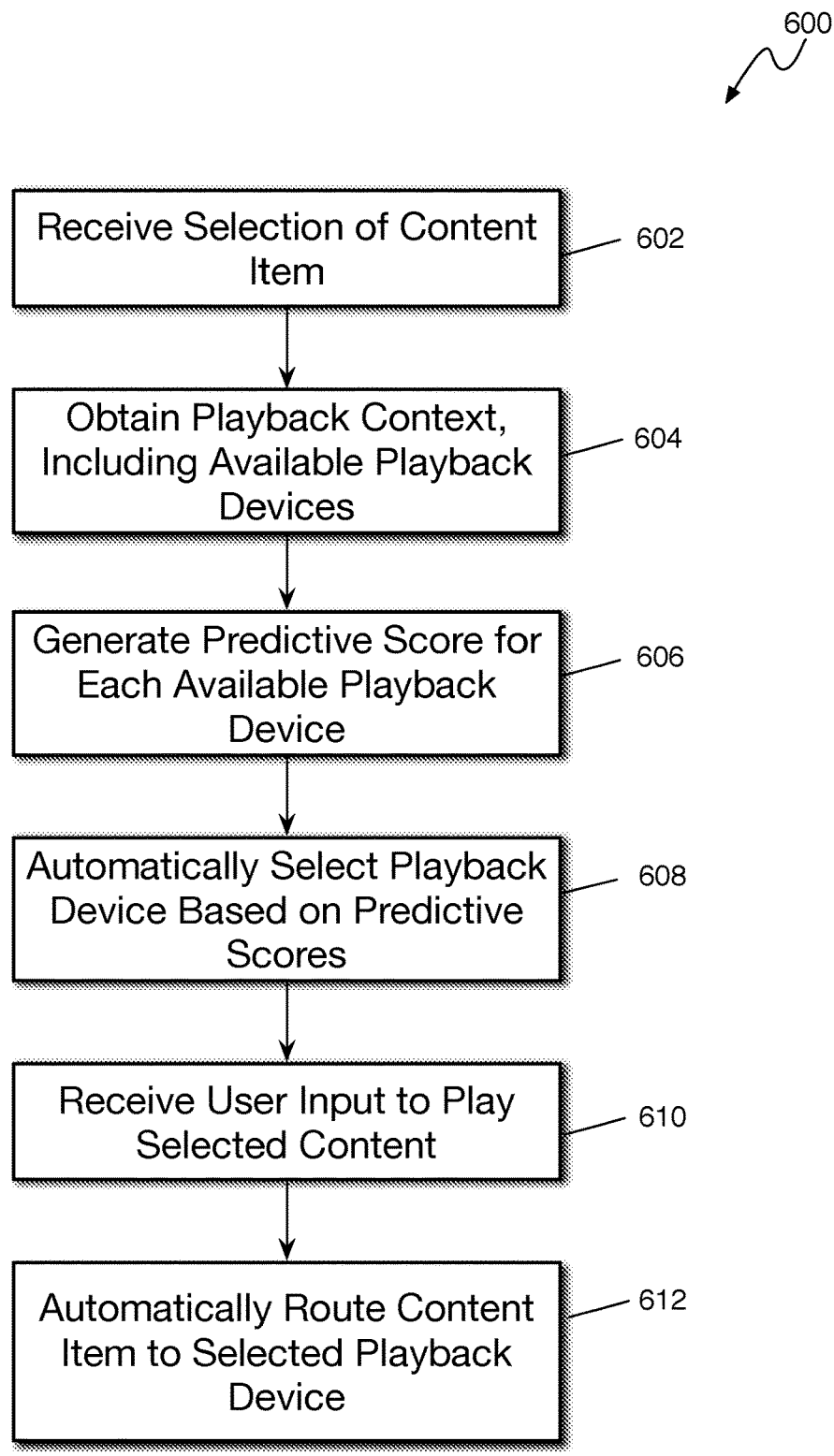
FIG. 6 is flow diagram of an example process for automatically routing media content to a predicted remote playback device.

FIG. 6 is flow diagram of an example process 600 for automatically routing media content to a predicted remote playback device. For example, process 600 can be performed by user device 302 to automatically select a playback device for presenting content selected by the user on user device 302. The automatically selected playback device can be a remote playback device. The automatically selected playback device can be user device 302. When user device 302 receives user input to initiate playback of the user selected content item, user device 302 can automatically send or route the selected content item to the automatically selected playback device without receiving user input selecting the playback device.

At step 602, user device 302 can receive a selection of a content item. For example, user device 302 can include a software application that allows the user to browse, search for, and/or find media content to view and/or listen to. The user can interact with the application and select a media content item that the user wishes to consume.

At step 604, user device 302 can obtain playback context information. For example, user device 302 can obtain local playback context information locally on user device 302 from metadata associated with the selected content item, applications installed on user device 302, various components of user device 302 (e.g., a clock), etc., as described above. User device 302 can obtain remote playback context information from remote playback devices. For example, user device 302 can determine which playback devices are available on the same network to which user device 302 is connected and send a request to those playback devices to obtain their playback state, as described above.

At step 606, user device 302 can generate a predictive score for each available playback device. For example, the predictive score can represent how likely the user of user device 302 is to want to play the selected content item on the respective playback devices. The predictive score can be generated based on the playback context information obtained at step 604, and/or historical user behavior data collected by and/or stored on user device 302, as described above.

At step 608, user device 302 can automatically select a playback device based on the predictive scores generated for each playback device. For example, if a playback device has not been disqualified (described above) from automatic selection and playback and the predictive score of the playback device puts it in the high classification, then user device 302 can automatically select the playback device for presenting the user selected content item. User device 302 can present an identifier for the automatically selected playback device on a playback user interface (e.g., GUI 100, GUI 200) so that the user can see which playback device will present the selected content item, as described above.

At step 610, user device 302 can receive user input to play the selected content item. For example, user device 302 can receive user input to the playback user interface selecting a play button or control to initiate playback of the user selected content item. For example, user device 302 can receive user input through GUI 100 indicating that the user wishes to initiate playback of the selected content item.

At step 612, user device can automatically route the content item to the automatically selected playback device. For example, user device 302 can send (e.g., stream or hand off) the content item to the automatically selected playback device for presentation. User device 302 can automatically send the content item to the playback device without receiving any user input explicitly or expressly selecting the playback device.

Figure 7:
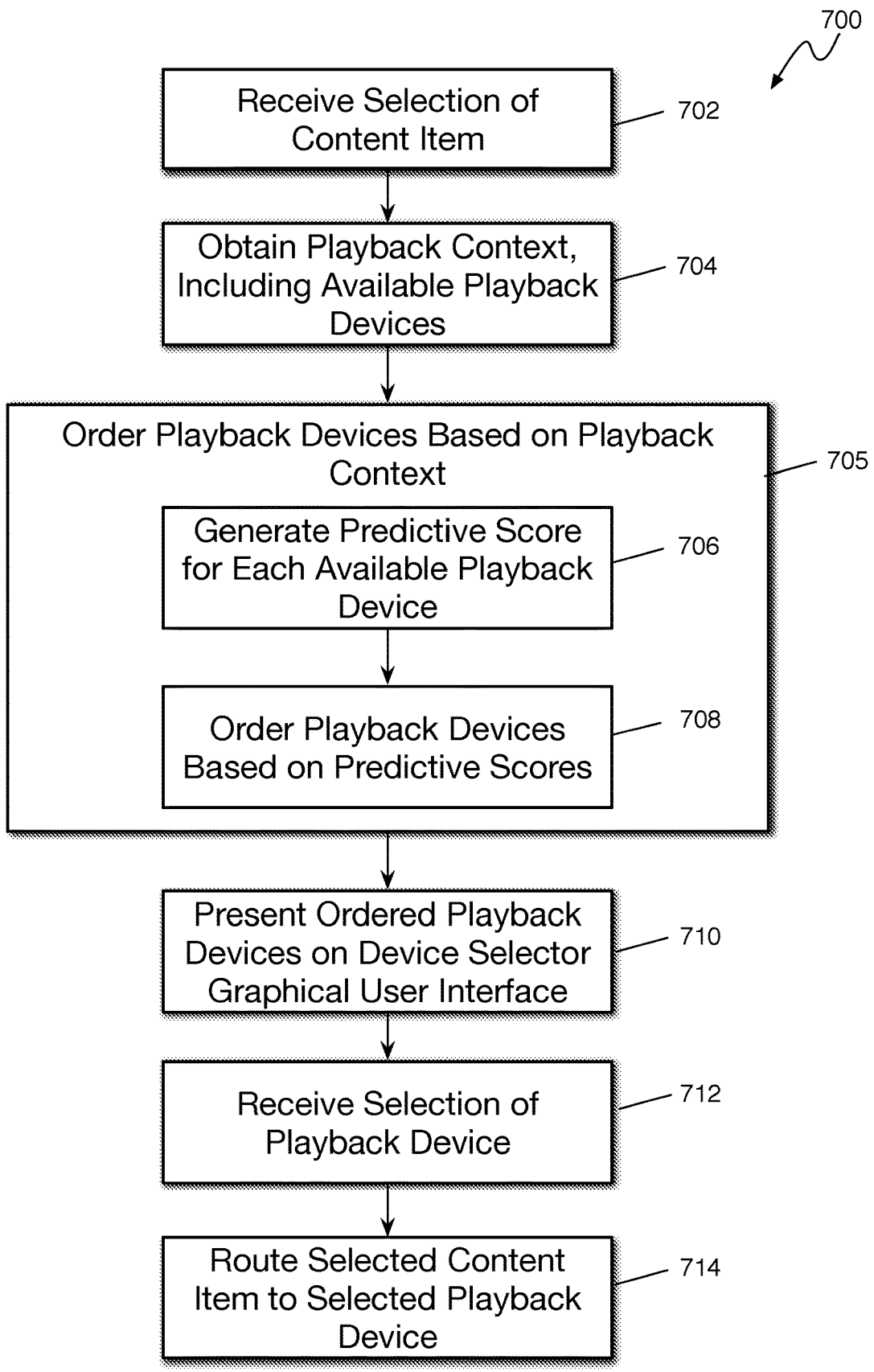
FIG. 7 is flow diagram of an example process for efficiently presenting available playback devices based on predictive scores.

FIG. 7 is flow diagram of an example process 700 for efficiently presenting available playback devices based on predictive scores. For example, process 700 can be performed by user device 302 to present playback devices in a way that allows the user to efficiently and quickly find and select the playback devices the user is most likely to use to present the currently selected content item.

At step 702, user device 302 can receive a selection of a content item. For example, user device 302 can include a software application that allows the user to browse, search for, and/or find media content to view and/or listen to. The user can interact with the application and select a media content item that the user wishes to consume.

At step 704, user device 302 can obtain playback context information. For example, user device 302 can obtain local playback context information locally on user device 302 from metadata associated with the selected content item, applications installed on user device 302, various components of user device 302 (e.g., a clock), etc., as described above. User device 302 can obtain remote playback context information from remote playback devices. For example, user device 302 can determine which playback devices are available on the same network to which user device 302 is connected and send a request to those playback devices to obtain their playback state, as described above.

At step 705, user device 302 can generate an ordered collection of the available playback devices based on the playback context information. For example, user device 302 can order the available playback devices based on steps 706 and/or 708, described below. Alternatively, user device 302 can order the available playback devices based on some other ordering criteria or specific playback context information without generating predictive scores for the playback devices. For example, user device 302 can order the available playback devices based on proximity (e.g., how near a playback device is to user device 302). As another example, user device 302 can order the available playback devices based on recency and/or frequency of use or selection by the user of user device 302. As another example, user device 302 can order the available playback devices first based on proximity, and then based on recency or frequency (e.g., when two playback devices are the same distance from user device 302) or some other combination of contextual data. Thus, in some implementations, steps 706 and/or 708 may not be performed by user device 302 when other ordering mechanisms are used, while in other implementations step 705 can be defined by steps 706 and/or 708 when predictive scores are used to order the playback devices.

At step 706, user device 302 can generate a predictive score for each available playback device. For example, the predictive score can represent how likely the user of user device 302 is to want to play the selected content item on the respective playback devices. The predictive score can be generated based on the playback context information obtained at step 704, and/or historical user behavior data collected by and/or stored on user device 302, as described above.

At step 708, user device 302 can order playback devices based on the predictive scores generated for each playback device. For example, user device 302 can generate an ordered collection (e.g., list) of playback devices associated with the high and medium classes (described above) ordered according to their respective predictive scores. User device 302 can generate an ordered collection of playback devices associated with the low class alphabetically based on the respective identifiers (e.g., names) of the playback devices.

At step 710, user device 302 can present the ordered playback devices on a playback device selector graphical user interface. For example, when user device 302 determines that there are no playback devices associated with the high classification, then user device 302 may present the ordered collections of playback devices on graphical element 202 of GUI 200 as a prompt to the user to select a playback device for presenting the selected content item. The prompt, including the ordered list of playback devices, can be presented in response to the user selecting a play button or otherwise providing a play command or input to user device 302. Alternatively, user device 302 may present the ordered collections of playback devices on graphical element 202 of GUI 200 in response to receiving user input selecting graphical element 106 of GUI 100. The ordered collections of playback devices can be presented such that the high and medium class playback devices are presented in a prominent, easy to locate, easy to see position on graphical element 202.

At step 712, user device 302 can receive a selection of a playback device. For example, the user of user device can select a playback device presented on graphical element 202.

At step 714, user device 302 can route the selected content item to the user selected playback device. For example, in response to receiving the user input selecting the playback device, user device may stream or hand off the selected content item to the selected playback device for presentation. Alternatively, when the selected playback device corresponds to user device 302, user device 302 can present the selected content item using the display and/or speakers of user device 302.

Figure 8:
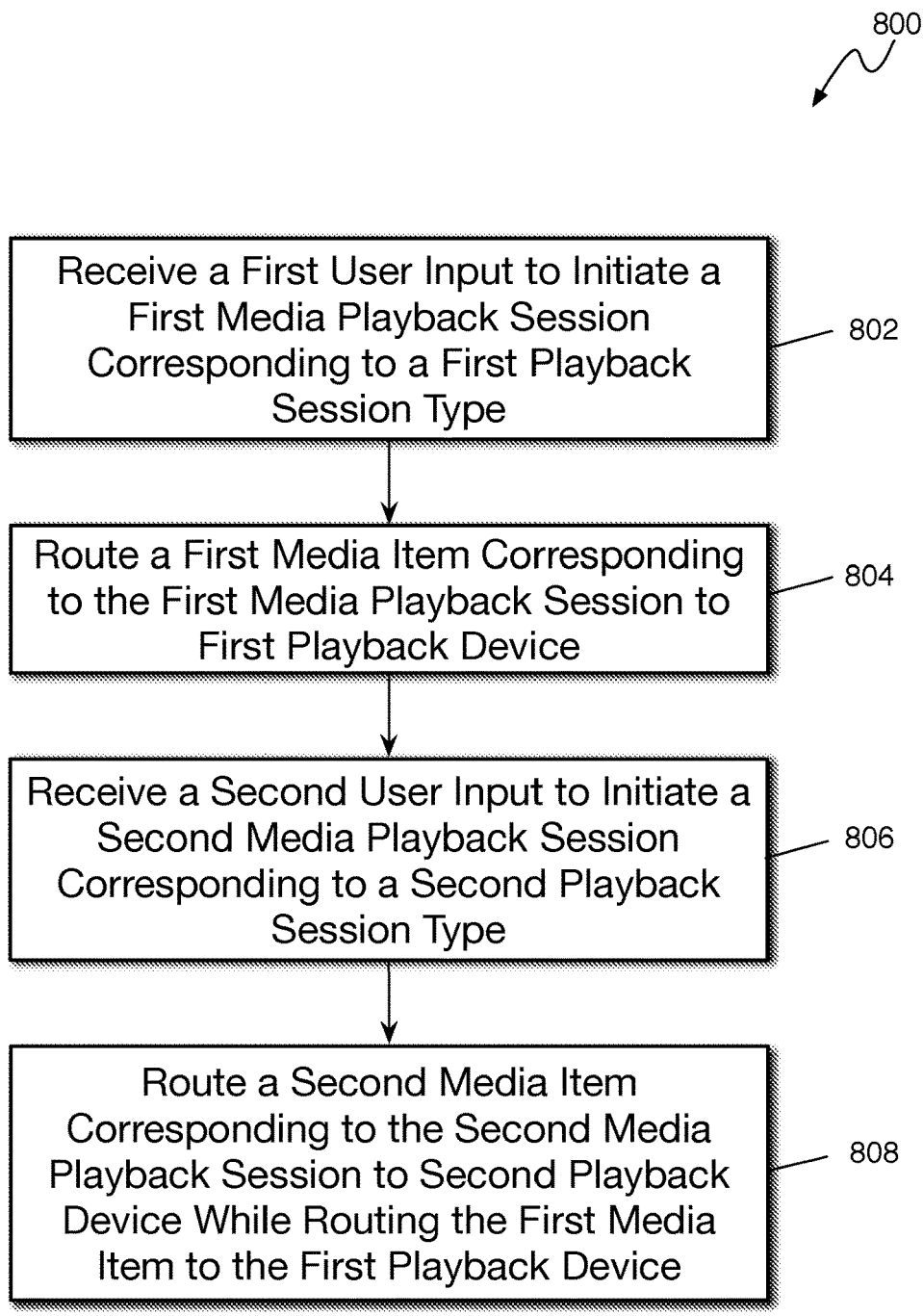
FIG. 8 is a flow diagram of an example process for routing different content items from a single computing device to different playback devices.

FIG. 8 is a flow diagram of an example process 800 for routing different content items from a single computing device to different playback devices. For example, process 800 can be performed by user device 302 to route media items corresponding to different playback sessions to different playback destinations. A user may, for example, wish to present movie content from user device 302 on remote playback device 330 while presenting music content on remote playback device 340. As another example, the user may wish to present a television show from user device 302 on remote playback device 360 while presenting social media audio and/or video content locally on user device 302.

At step 802, user device 302 can receive a first user input to initiate a first media playback session corresponding to a first playback session type. For example, the user may provide user input to user device 302 commanding user device 302 to present a movie on remote playback device 330. User device 302 can generate a long-form video playback session to manage the presentation and routing of the movie on remote playback device 330.

At step 804, user device 302 can route a first media item corresponding to the first media playback session to a first playback device. For example, in response to user input selecting the first playback device and/or initiating playback of the first media item corresponding to the first media playback session, user device 302 can route the first media item corresponding to the first media playback session to the first playback device.

At step 806, user device 302 can receive a second user input to initiate a second media playback session corresponding to a second playback session type. For example, the user may provide user input to user device 302 commanding user device 302 to present a song on remote playback device 340. User device 302 can generate a long-form audio playback session to manage the presentation and routing of the song on remote playback device 340.

At step 808, user device 302 can route a second media item corresponding to the second media playback session to a second playback device. For example, in response to user input selecting the second playback device and/or initiating playback of the second media item corresponding to the second media playback session, user device 302 can determine that the destination playback device for the long-form audio playback session does not conflict with (e.g., is not the same destination as) the destination playback device for the long-form video playback session. In response to determining that there is no conflict, user device 302 can route the song corresponding to the second media playback session to the second playback device. Thus, user device 302 can manage and route two or more media playback sessions (and corresponding media items) to multiple different destination playback devices at the same time.

Figure 9:
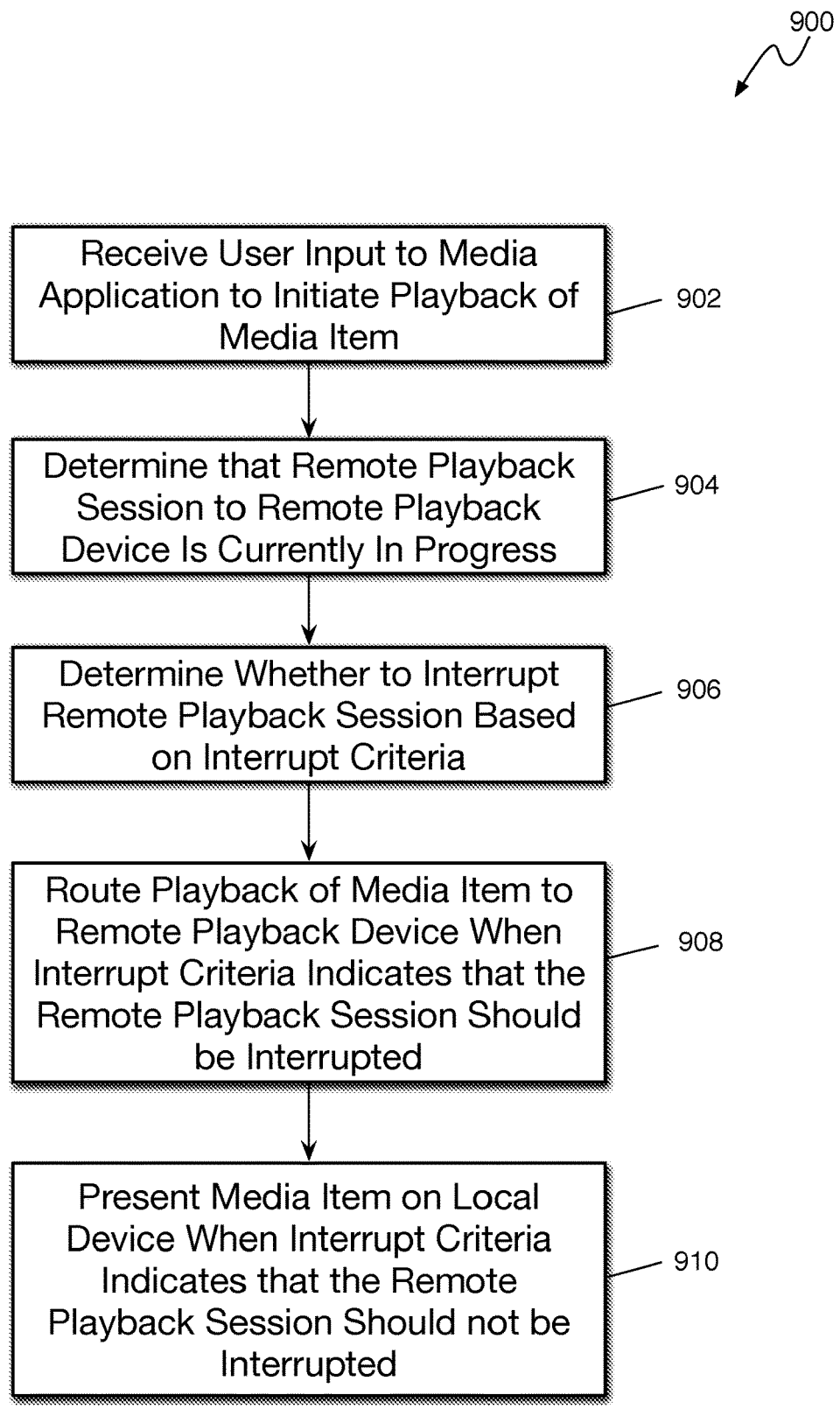
FIG. 9 is a flow diagram of an example process for determining when to interrupt a remote playback session.

FIG. 9 is a flow diagram of an example process 900 for determining when to interrupt a remote playback session. For example, process 900 can be performed by user device 302 to determine which media applications and/or media content items can cause the interrupting of the playback of a currently playing media content item on a remote playback device. As described above with respect to FIG. 8, user device 302 can route media content items to multiple destinations simultaneously. However, when two media sessions attempt to route media content items to the same playback device, user device 302 will determine whether to interrupt the content item currently playing on the remote playback device to allow playback of a newly selected content item on the remote playback device according to process 900, described below.

In some implementations, process 900 may be performed only when performing automatic media routing. If the user has specified the remote playback device for presenting the selected media content item, then user device 302 will route the selected media content item to the specified playback device and interrupt whatever media content is currently playing on the specified playback device. At step 902, user device 302 can receive user input to a media application to initiate playback of a media content item. For example, the user can interact with application 304 to select a media content item. In response to receiving the invocation of media application 304 and/or the selection of the media content item, user device 302 can generate a media playback session based on the type of media provided by application 304 and automatically select a remote playback device for presenting the selected media content item. User device 302 can receive user input to play the selected media content item.

At step 904, user device 302 can determine that a remote playback session to the selected remote playback device is currently in progress. For example, media session manager 136 can determine that another media playback session is currently being routed to the remote playback device that was automatically selected at step 902.

At step 906, user device 302 can determine whether to interrupt the in-progress remote playback session based on various interrupt criteria. For example, media session manager 136 can determine whether to interrupt the in progress remote playback session based on the black list, white list, indicia of importance, and/or other interrupt criteria described above.

At step 908, user device 302 can route the playback of the selected media content item to the automatically selected remote playback device when the interrupt criteria indicate that the remote playback session should be interrupted. For example, media session manager 136 can terminate the playback of the media item corresponding to the in-progress playback session and initiate playback of the selected media content item on the automatically selected remote playback device.

At step 910, user device 302 can present the selected media item on the local user device when the interrupt criteria indicate that the remote playback session should not be interrupted. For example, media session manager 136 can initiate playback of the selected media content item on user device 302. If user device 302 is currently presenting another media content item locally, then media session manager 136 can interrupt the playback of the currently playing content item on user device 302 and initiate playback of the selected media content item.

Figure 10:
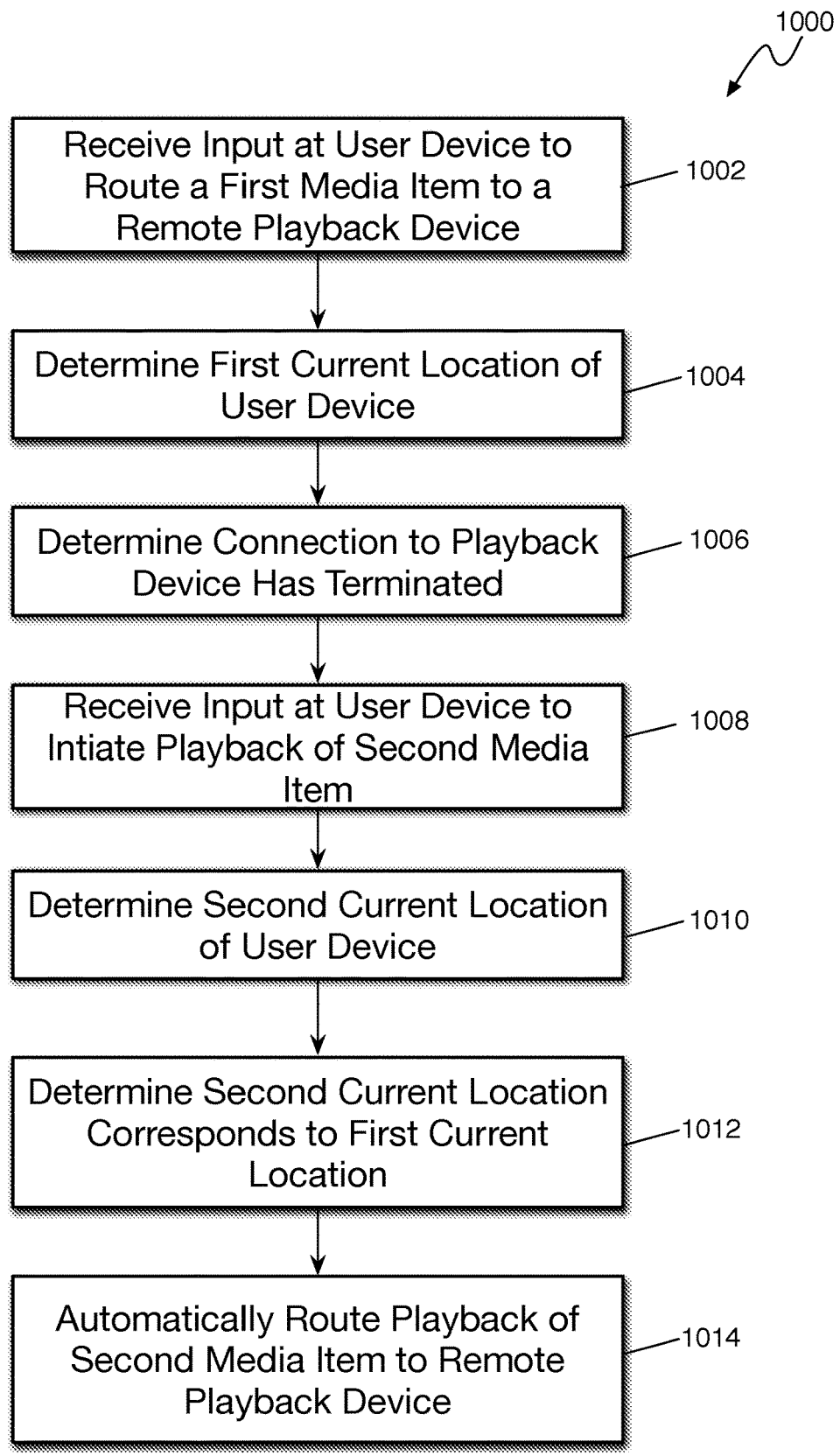
FIG. 10 is a flow diagram of an example process for resuming a routing session based on location.

FIG. 10 is a flow diagram of an example process 1000 for resuming a routing session based on location. For example, process 1000 can be performed by user device 302 to resume a playback session routed to a particular remote playback device when user device 302 returns to a particular location where user device 302 has previously routed playback to the particular remote playback device.

At step 1002, user device 302 can receive input to route a first media item to a remote playback device. For example, user device 302 can receive explicit input indicating that a media content item should be routed to the remote playback device. User device 302 can automatically route a media content item to the remote playback device in response to receiving user input to play the media content item. User device 302 can generate a playback session for managing the playback of the first media content item on the remote playback device.

At step 1004, user device 302 can determine a first current location of user device. For example, user device 302 can determine a first pinpoint location where the user initiated the playback session to the remote playback device and store the first pinpoint location in the playback session data.

At step 1006, user device 302 can determine that a connection to the playback device has terminated. For example, user device 302 can determine that the connection to the playback device has terminated when user device 302 is no longer on the same network as the remote playback device. For example, the user may have left her house with user device 302 and user device 302 may no longer be connected to the user's home network.

At step 1008, user device 302 can receive input at user device to initiate playback of a second media item. For example, the media item can be the same media item as the media item described at step 1002. The media item can be a different media item (e.g., a second media item) than the media item described at step 1002. However, the media item and/or media application providing the media item may be associated with the same media playback session type (e.g., long-form video, long-form audio, rich media, non-media, etc.). If the media playback session of step 1002 has not terminated (e.g., less than the threshold period of time has elapsed since the last playback event for the session), then the playback session may still be configured to route to the same remote playback device.

At step 1010, user device 302 can determine a second current location of user device 302. For example, user device 302 can determine a second pinpoint location where the user initiated the playback at step 1008.

At step 1012, user device 302 can determine that the second current location corresponds to the first current location. For example, user device 302 can determine that the first pinpoint location determined at step 1004 is within a threshold measure of similarity to the second pinpoint location determined at step 1010.

At step 1014, user device 302 can automatically route playback of the second media item to the remote playback device. For example, because user device 302 has returned to the same location as the playback session initiated at step 1002 and because the playback session was never terminated and because the playback initiated at step 1008 is with respect to a media content item and/or media application associated with the same playback session type as the playback session, user device 302 can automatically route the playback of the second media item to the remote playback device configured for the playback session. For example, media session manager 316 can compare the playback session type and the pinpoint location associated with the second media item to the session type and pinpoint location of existing playback sessions. If there is an existing (e.g., not yet terminated) playback session that has the same session type and the same pinpoint location, then user device 302 can route the playback of the second media item to the same destination playback device that is configured for the matching, existing playback session thereby resuming the existing, but possibly inactive, playback session. Thus, user device 302 can resume the playback session started at step 1002 when user device 302 returns to the first current location.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to reduce the amount of user input required to select a playback device for presenting media content items and to improve the efficiency with which a user can identify and/or select playback devices. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the user's enjoyment of their personal devices and various types of playback devices the user may have around their home and/or office.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, general rules for media routing can be used that do not rely on the user's personal information. The predictive routing mechanisms described herein can use media metadata and/or other public information to predictively route a selected media content item to a playback device.

Example System Architecture

Figure 11:
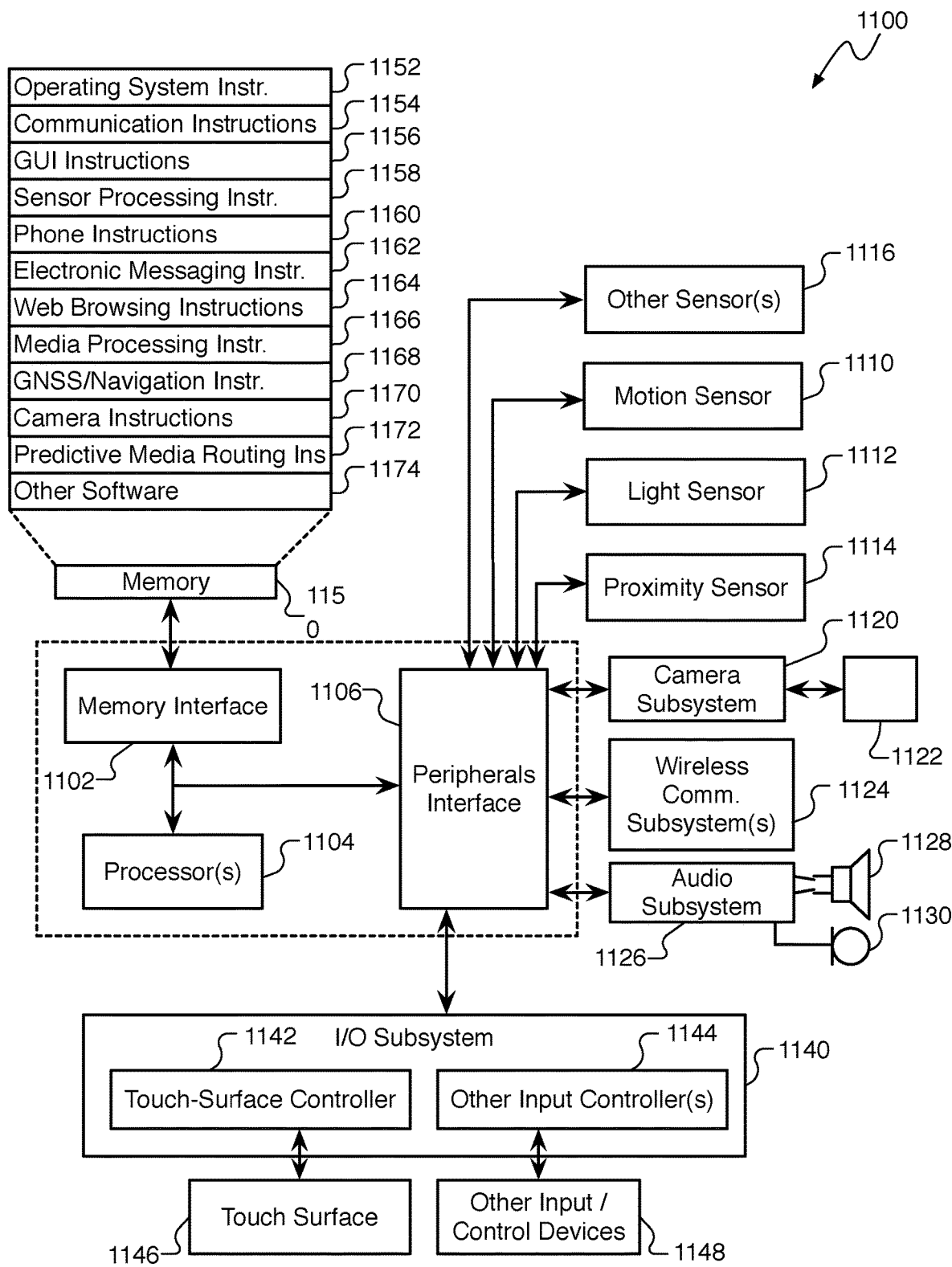
FIG. 11 is a block diagram of an example computing device that can implement the features and processes of FIGS. 1-10.

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voice printing and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™.

The memory interface 1102 can be coupled to memory 1150. The memory 1150 can include high-speed random-access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the predictive media routing features as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store software instructions 1172 to facilitate other processes and functions, such as the predictive media processes and functions as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   receiving, by a computing device from a media application, a first user input initiating playback of a first media item;
   determining, by the computing device, a first playback device to route the playback of the first media item;
   in response to determining that a remote playback session to the first playback device is in progress: determining, by the computing device, whether to interrupt the remote playback session on the first playback device based on whether the media application is allowed to interrupt the remote playback session; and
   in response to determining that the media application is allowed to interrupt the remote playback session:
      terminating, by the computing device, the remote playback session on the first playback device; and
      wirelessly routing, by the computing device, the first media item to the first playback device.

2. The method as recited in claim 1, further comprising, prior to wirelessly routing the first media item to the first playback device, determining, by the computing device, that there is no conflict with the first playback device for playback of the first media item.

3. The method as recited in claim 2, wherein the first media item is wirelessly routed to the first playback device in response to determining that there is no conflict with the first playback device for playback of the first media item.

4. The method as recited in claim 1, wherein the media application is allowed to interrupt the remote playback session in response to at least one of: determining that the media application participates in operating system level user interface features, and determining that the media application is entitled to present audio content while running as a background application.

5. The method as recited in claim 1, further comprising, prior to wirelessly routing the first media item to the first playback device:
   determining, by the computing device, whether the remote playback session to the first playback device is in progress,
   wherein determining whether to interrupt the remote playback session on the first playback device is further based on one or more interrupt criteria.

6. The method as recited in claim 5, wherein the one or more interrupt criteria comprise: a type of media or a length of media, and wherein the one or more interrupt criteria are analyzed in accordance with a hierarchy of the one or more criteria.

7. The method as recited in claim 1, wherein determining whether to interrupt the remote playback session on the first playback device comprises:
- determining that the media application is not included in a black list of applications that are not allowed to interrupt the remote playback session; or
- determining that the media application is included in a white list of applications that are allowed to interrupt the remote playback session.

8. A system comprising:
one or more processors; and
a non-transitory computer-readable medium comprising a set of instructions that, when executed by the one or more processors, causes the one or more processors to perform operations comprising:
- receiving, by a computing device from a media application, a first user input initiating playback of a first media item;
- determining, by the computing device, a first playback device to route the playback of the first media item;
- in response to determining that a remote playback session to the first playback device is in progress: determining, by the computing device, whether to interrupt the remote playback session on the first playback device based on whether the media application is allowed to interrupt the remote playback session; and
- in response to determining that the media application is allowed to interrupt the remote playback session:
  - terminating, by the computing device, the remote playback session on the first playback device; and
  - wirelessly routing, by the computing device, the first media item to the first playback device.

9. The system as recited in claim 8, wherein the operations further comprise, prior to wirelessly routing the first media item to the first playback device, determining, by the computing device, that there is no conflict with the first playback device for playback of the first media item.

10. The system as recited in claim 9, wherein the first media item is wirelessly routed to the first playback device in response to determining that there is no conflict with the first playback device for playback of the first media item.

11. The system as recited in claim 8, wherein the media application is allowed to interrupt the remote playback session in response to at least one of: determining that the media application participates in operating system level user interface features, and determining that the media application is entitled to present audio content while running as a background application.

12. The system as recited in claim 8, wherein the operations further comprise, prior to wirelessly routing the first media item to the first playback device:
- determining, by the computing device, whether the remote playback session to the first playback device is in progress,
- wherein determining whether to interrupt the remote playback session on the first playback device is further based on one or more interrupt criteria.

13. The system as recited in claim 12, wherein the one or more interrupt criteria comprise: a type of media or a length of media, and wherein the one or more interrupt criteria are analyzed in accordance with a hierarchy of the one or more criteria.

14. The system as recited in claim 8, wherein determining whether to interrupt the remote playback session on the first playback device comprises:
- determining that the media application is not included in a black list of applications that are not allowed to interrupt the remote playback session; or
- determining that the media application is included in a white list of applications that are allowed to interrupt the remote playback session.

15. A non-transitory computer-readable medium comprising a set of instructions that, when executed by one or more hardware processors, causes the one or more hardware processors to perform operations comprising:
- receiving, by a computing device from a media application, a first user input initiating playback of a first media item;
- determining, by the computing device, a first playback device to route the playback of the first media item;
- in response to determining that a remote playback session to the first playback device is in progress: determining, by the computing device, whether to interrupt the remote playback session on the first playback device based on whether the media application is allowed to interrupt the remote playback session; and
- in response to determining that the media application is allowed to interrupt the remote playback session:
  - terminating, by the computing device, the remote playback session on the first playback device; and
  - wirelessly routing, by the computing device, the first media item to the first playback device.

16. The non-transitory computer-readable medium as recited in claim 15, wherein the operations further comprise, prior to wirelessly routing the first media item to the first playback device, determining, by the computing device, that there is no conflict with the first playback device for playback of the first media item.

17. The non-transitory computer-readable medium as recited in claim 16, wherein the first media item is wirelessly routed to the first playback device in response to determining that there is no conflict with the first playback device for playback of the first media item.

18. The non-transitory computer-readable medium as recited in claim 15, wherein the media application is allowed to interrupt the remote playback session in response to at least one of: determining that the media application participates in operating system level user interface features, and determining that the media application is entitled to present audio content while running as a background application.

19. The non-transitory computer-readable medium as recited in claim 15, wherein the operations further comprise, prior to wirelessly routing the first media item to the first playback device:
- determining, by the computing device, whether the remote playback session to the first playback device is in progress,
- wherein determining whether to interrupt the remote playback session on the first playback device is further based on one or more interrupt criteria.

20. The non-transitory computer-readable medium as recited in claim 19, wherein the one or more interrupt criteria comprise: a type of media or a length of media, and wherein the one or more interrupt criteria are analyzed in accordance with a hierarchy of the one or more criteria.

* * * * *